United States Patent [19]

Brindle

[11] Patent Number: 5,385,474
[45] Date of Patent: Jan. 31, 1995

[54] MEDICAL SIMULATOR

[76] Inventor: Charles Brindle, 4685 N. Wilshire Rd., Whitefish Bay, Wis. 53211

[21] Appl. No.: 989,034

[22] Filed: Dec. 9, 1992

[51] Int. Cl.$^6$ .................................................. G09B 23/00
[52] U.S. Cl. ...................................... 434/267; 434/262
[58] Field of Search ............... 434/262, 265, 267, 272, 434/219, 224, 335; 128/671, 715, 774, 716, 668, 670

[56] References Cited

U.S. PATENT DOCUMENTS 4,360,345  11/1982  Hon ........................................ 434/262
4,932,879   6/1990  Ingenito et al. ....................... 434/262
5,018,082   5/1991  Obata et al. ...................... 434/335 X

OTHER PUBLICATIONS

*Anesthesiology*, V. 72, No. 1, Jan. 1990; "The Anesthesia Simulator-Recorder: A Device to Train and Evaluate Anesthesiologists' Responses to Critical Incidents" by Howard A. Schwid, M. D. and Daniel O'Donnell, Ph.D., pp. 191-197.

*Primary Examiner*—Richard J. Apley
*Assistant Examiner*—Glenn E. Richmond
*Attorney, Agent, or Firm*—Quarles & Brady

[57] ABSTRACT

A method of simulating anesthesiology and operating room conditions including the steps of displaying initial patient simulated vital sign information from a memory to signify an initial patient condition, randomly modifying the displayed patient vital sign information according to a script matrix in a manner analogous to that in which a patient's vital signs would be effected in the operating room by drugs and other external effects, thereby indicating a deteriorating condition, displaying user options, evaluating the timeliness and appropriateness of user input selections from the options in response to the changes in patient vital sign data, and causing the patient vital sign information to improve to its initial state or deteriorate to a critical state in accordance with the successive script blocks in the script matrix depending upon the user's response and timeliness.

15 Claims, 34 Drawing Sheets

FIG. 1a
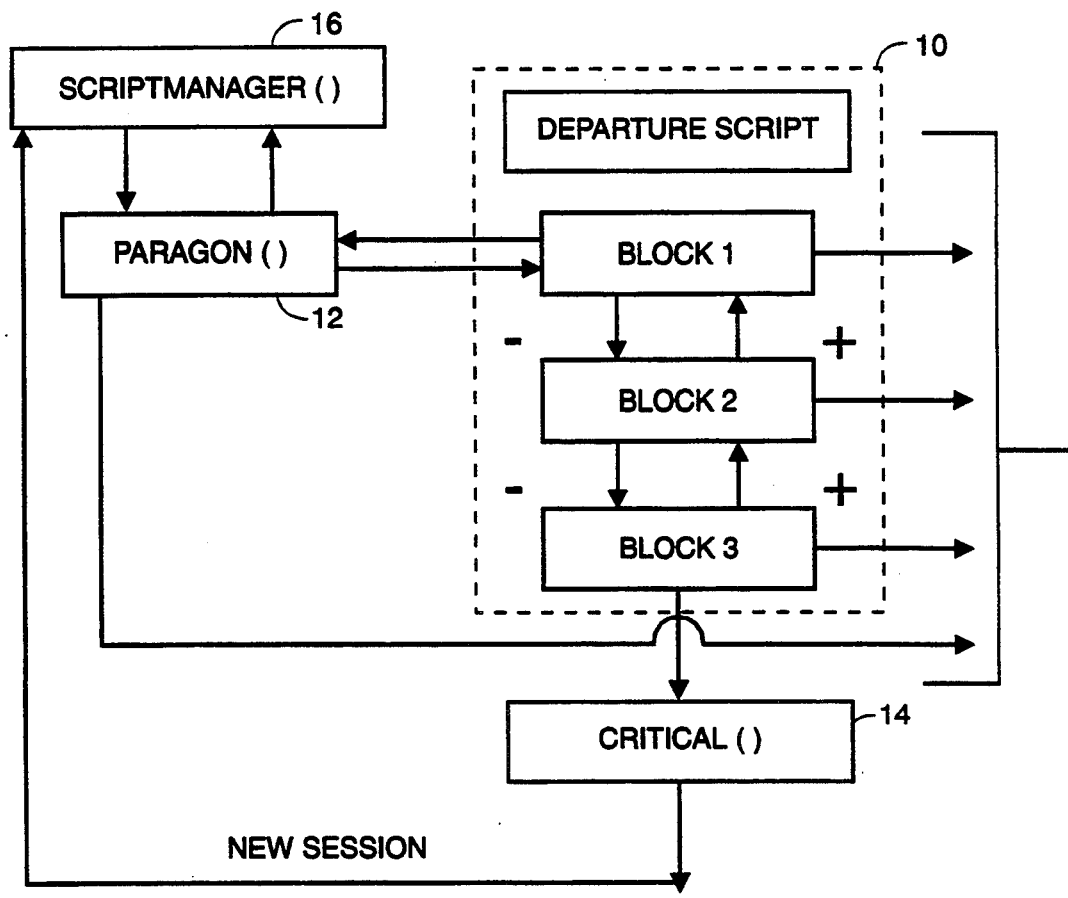
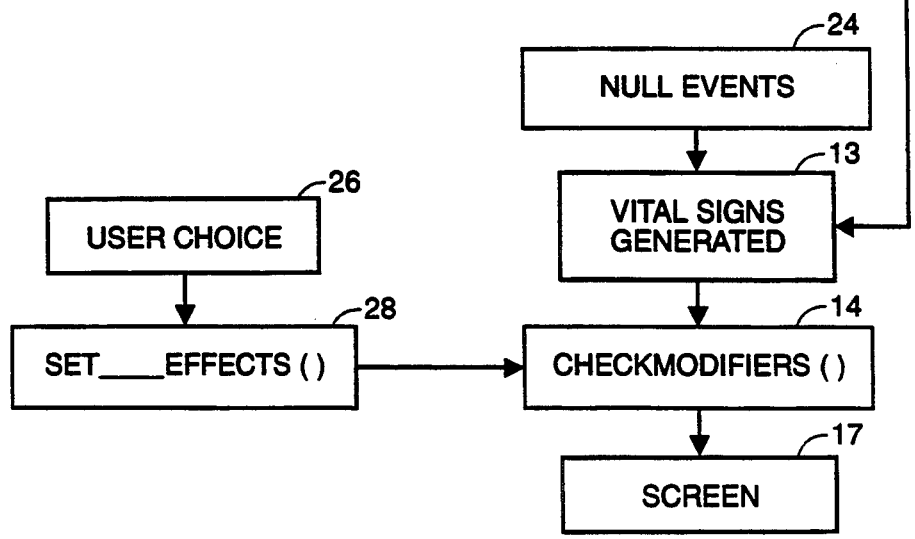

FIG. 2
SCRIPT MATRIX

|   | SCRIPT 0 | SCRIPT 1 | — | SCRIPT 3 | SCRIPT 4 | SCRIPT 5 | — | SCRIPT 9 |
|---|---|---|---|---|---|---|---|---|
| 0 | PARAGON | | | | | | | |
| 1 | | | | MH1 (301) | BLEED1 (401) | EMBO1 (501) | | |
| 2 | | | | MH2 (302) | BLEED2 (402) | EMBO2 (502) | | |
| 3 | | | | MH3 (303) | BLEED3 (403) | EMBO3 (503) | | |
| • | | | | | | | | |
| • | | | | | | | | |
| • | | | | | | | | |
| 7 | | | | | | | | CRITICAL (907) |
| 8 | | | | | | | | |
| 9 | | | | | | | | |

Script Block Template

LOOP FUNCTION TEMPLATE

EVAL FUNCTION TEMPLATE

BLEED 1

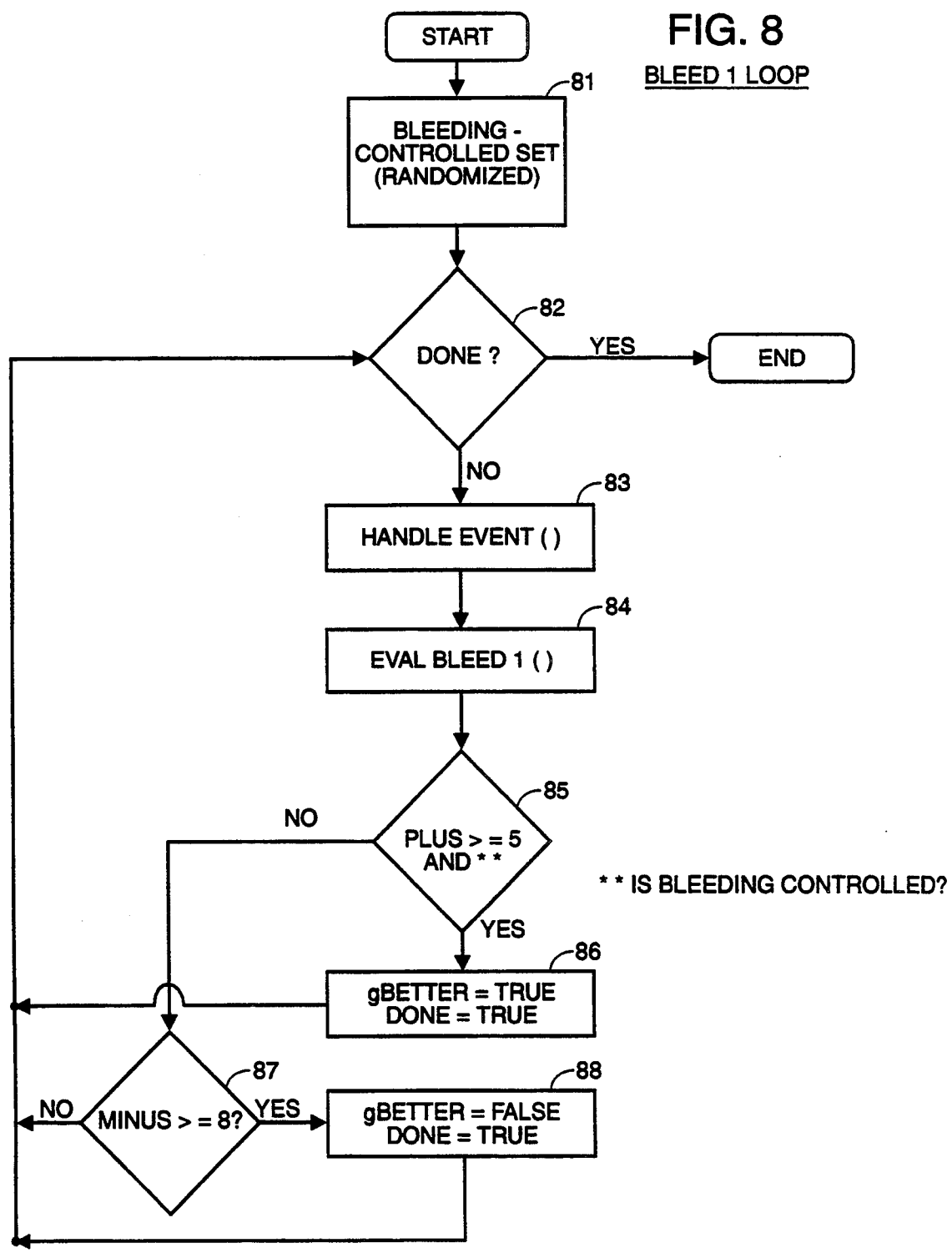

EVALBLEED 1

EVALBLEED 1 -- CONTINUED

MH1

MH1 LOOP

EVALMH1

EVALMH 1 --- CONTINUED

EMBO1

EMBO 1 LOOP

EVALEMBO1

(TO FIG. 15b)

EVALEMBO1 -- CONTINUED

FIG. 19

59 y/o Healthy Female

Procedure: Colectomy

BP: 130 / 70

Pulse: 83

Temp: 37

Weight(kg): 70

[CLOSE]

FIG. 20

```
IV Started. Choose Fluid:
*********************************
BOLUS:  ○         INFUSION: ●
(ML)              (ML/HR)
*********************************
RL    ●            NSS    ○
D5RL  ○            HESPAN ○
D5W   ○            RBCs   ○
*********************************
MLS:
 50  ○      250 ○      500  ○
100  ○      300 ●     1000  ○
150  ○      350 ○           [Done]
200  ○      400 ○
```

FIG. 25

| | | |
|---|---|---|
| Norcuron ☐ | Atropine ☐ | |
| Tracrium ☒ | Regonol ☐ | |
| Sux ☐ | Robinul ☐ | |

Dose (mg)

| | | | | | |
|---|---|---|---|---|---|
| 5 ☐ | 20 ☐ | 100 ☐ | 160 ☐ | | |
| 10 ☐ | 40 ☒ | 120 ☐ | 180 ☐ | | |
| 15 ☐ | 80 ☐ | 140 ☐ | 200 ☐ | | |

[Cancel] [OK]

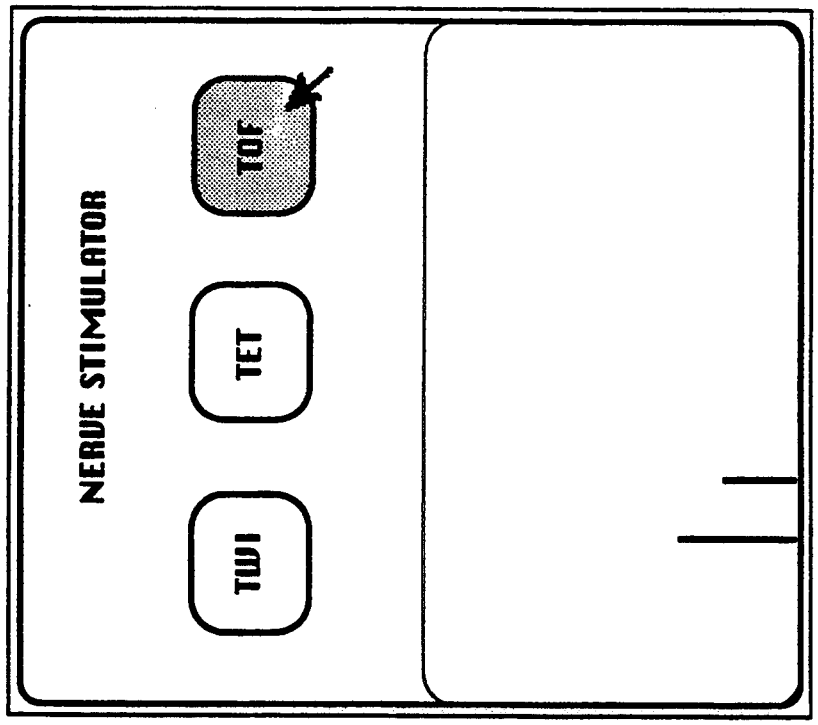
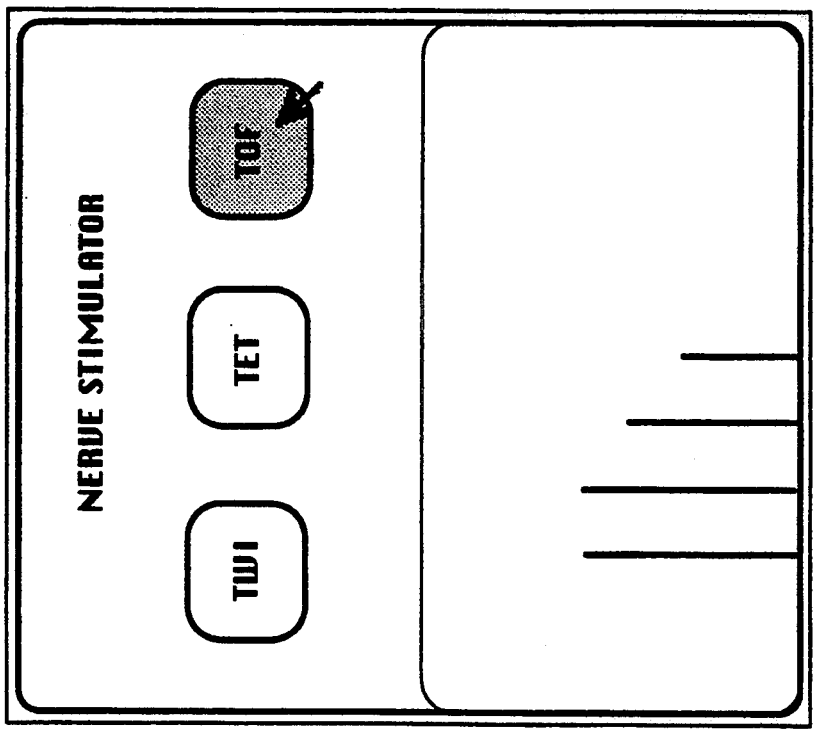
FIG. 26

FIG. 27

| Tid Vol | | Rate | |
|---|---|---|---|
| 200 | ☐ | 4 | ☐ |
| 400 | ☐ | 6 | ☐ |
| 600 | ☐ | 8 | ☐ |
| 700 | ☒ | 10 | ☒ |
| 800 | ☐ | 12 | ☐ |
| 1000 | ☐ | 14 | ☐ |
| 1500 | ☐ | 16 | ☐ |

Done

MEDICAL SIMULATOR

BACKGROUND OF THE INVENTION

This invention relates to simulators and more particularly to simulating operating room mal-events.

During surgery, anesthesiologists are required to monitor multiple real time patient vital signs information and trends. In the event of a mal-event, the anesthesiologist must react quickly and accurately. For example, mal-events that may occur during surgery are malignant hyperthermia, embolism and acute surgical bleeding. Malignant hyperthermia is a disorder of muscle metabolism leading to hypermetabolism and eventually high fever. Embolism is a blockage of a major blood vessel by a blood clot, fat, or other substance, leading to problems with blood oxygenation and eventually cardiovascular collapse. Acute surgical bleeding, in which uncontrolled blood loss occurs, can lead to very low blood pressure and possibly cardiac arrest. If appropriate corrective measures are not taken on a timely basis, each of these conditions can result in the patient's death. In order no detect the onset of these conditions, the anesthesiologist normally monitors the patient's blood oxygen saturation, pulse rate, blood pressure, temperature and end-tidal $CO_2$. Any substantial deviation of some or all of these parameters from an initial base line value will indicate to the anesthesiologist the occurrence of an emergency situation and the nature of the event.

In training anesthesiologists and in upgrading their skills, the simulation of emergency situations is a valuable tool. However, the simulation of a complex biological system is extremely difficult. As a result, prior art simulators use models that are extremely complex. For example, an EKG simulator uses 5,000 to 100,000 comparisons to generate just one cardiac cycle with a program length of about 10,000 lines. Even so, such prior art simulators are not as realistic as originally hoped.

SUMMARY OF THE INVENTION

An object of the invention is to provide a new and improved medical simulator method.

Another object of the invention is to provide a new and improved anesthesiology simulator method.

A further object of the invention is to provide an anesthesiology simulator method having a high degree of realism.

Yet another object of the invention is to provide an anesthesiology simulator method which operates on a simulated real time basis.

A still further object of the invention is to provide an anesthesiology simulator method which operates on the basis of macroscopic events.

It is another object of the invention to provide a computer based anesthesiology simulator method which has a relatively short program length and requires a relatively small amount of memory.

These and other objects and advantages of the present invention will become more apparent from the detailed description thereof taken with the accompanying drawings.

In general terms, the invention comprises a method of simulating conditions as might be experienced in the operating room, including the steps of displaying from a memory simulated initial patient vital sign information, randomly modifying the vital sign information in accordance with one of a plurality of scripts, displaying a plurality of user input options, evaluating the input options selected by the user from the plurality of options in response to the changes in the visual vital sign information to determine the appropriateness and timeliness of responses, modifying said vital sign data in accordance with said script matrix for improvements of vital sign information displayed if the responses are appropriate and timely for return to the initial patient condition or continuing to display worsening vital sign information to a critical condition in accordance with the script if the responses are inappropriate or untimely.

According to another aspect, the invention comprises a computer coupled to a display monitor and including memory means, at least one script matrix being stored in said memory and consisting of a plurality of function blocks programmed to simulate on a display monitor emergency conditions as might be experienced in the operating room by an anesthesiologist, said computer being programmed to: transfer from said memory patient initial vital sign information for display on said monitor; randomly modify the vital sign information in accordance with one of a plurality of scripts stored in memory; transfer to the monitor for display user options; input user choices from the options displayed; time user responses in relation to preset time limits; evaluate user responses to changes in the visual vital sign information in accordance with the script matrix to determine the appropriateness and timeliness of responses: modify said vital sign information in accordance with said script matrix for improvements of vital sign information displayed if the responses are appropriate and timely; and continue to transfer from memory for display worsening vital sign information in accordance with the script if the responses are inappropriate and untimely.

BRIEF DESCRIPTION OF THE DRAWINGS

FIG. 1a is a block diagram illustrating the method according to the preferred embodiment of the invention;

FIG. 2 is a table illustrating the script matrix of the method according to the invention;

FIG. 8 shows an acute surgical bleeding loop;

FIGS. 18–29 are screens that the user will see during the method according to the present invention.

DETAILED DESCRIPTION OF THE PREFERRED EMBODIMENT

Figure 1B:
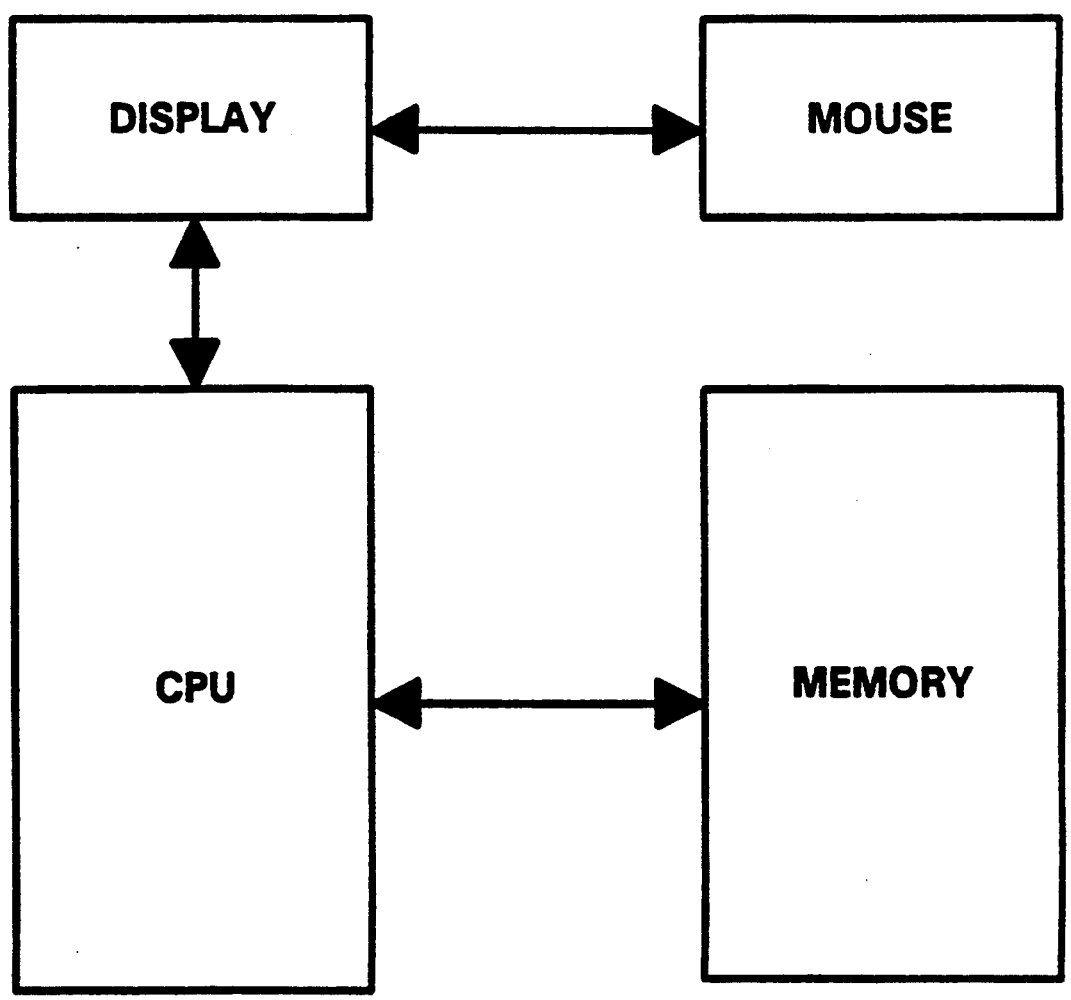
FIG. 1b is a block diagram illustrating a general purpose computer in which the method of the invention may be practiced.
Figure 3:
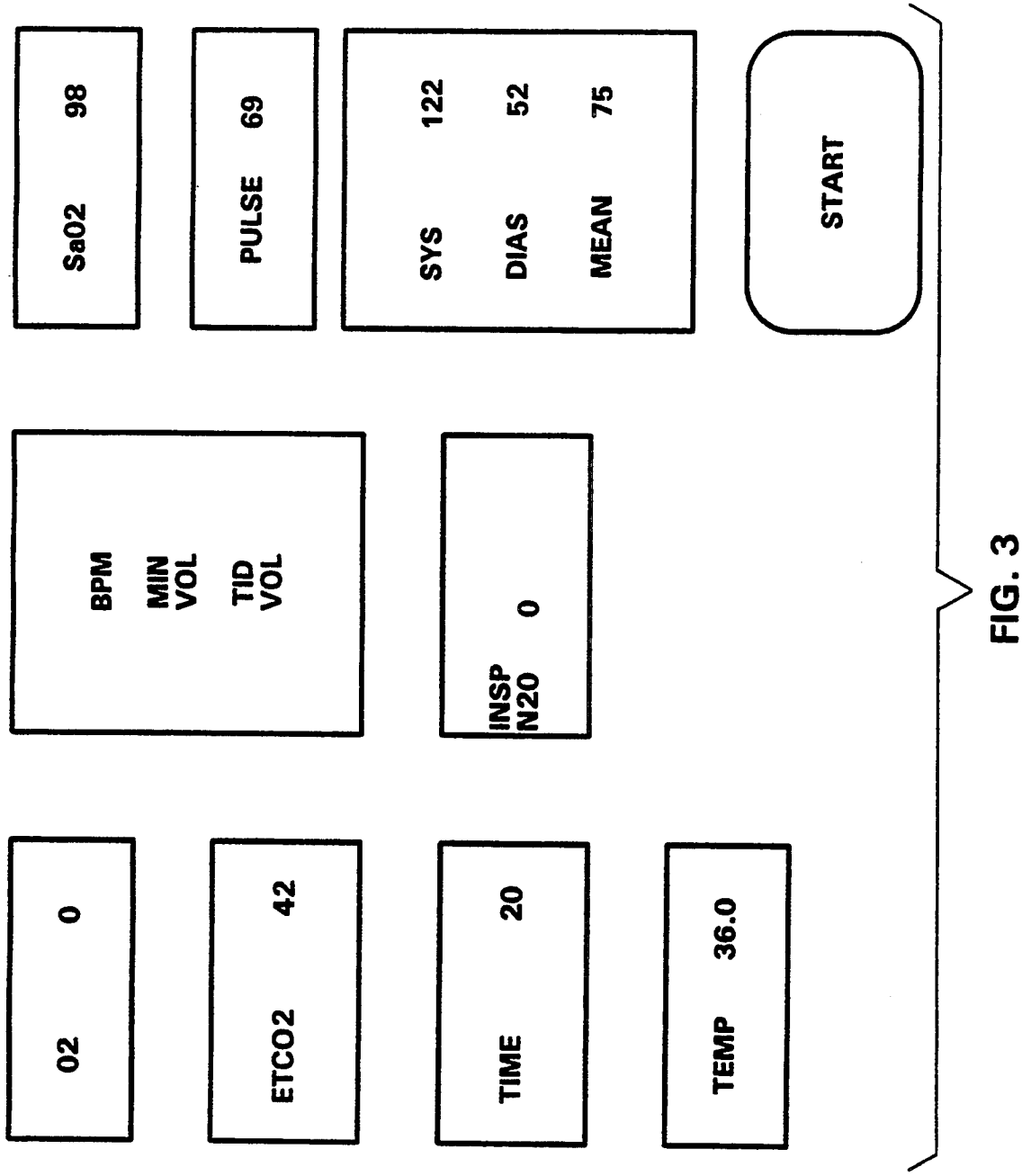
FIG. 3 illustrates a screen which is employed in performing a method according to the invention and illustrating some of the vital sign data an anesthesiologist would normally monitor.

The invention comprises a method adapted to be performed on a general personal computer such as an Apple Macintosh. The invention also includes a computer programmed to perform the method according to the invention. The computer is programmed to generate various simulated patient vital signs from a memory. These simulated patient vital signs are displayed on a monitor in a manner that they would typically be displayed in the operating room. Initially, the patient vital signs have base line values as they would occur prior to the delivery of anesthesia. Then, the program randomly selects from a memory bank one of the plurality of conditions from a group of potentially fatal conditions that may occur during a surgical procedure. At this point, the program follows scripts for simulating a predetermined sequence of actions and events which define well-known situations that occur during surgery. This is manifested on the monitor by changes in the patient's vital signs from the base line value on a real-time basis. The user must evaluate the patient's changes, diagnose the cause and initiate corrective actions within predetermined times. The users' reactions and their timeliness are evaluated and, depending upon the reaction of the user, the patient's condition will remain static, improve or deteriorate as reflected by the scripts. This will be indicated by further changes in the patient vital signs on the monitor. The process ends when the patient either "dies" or the vital signs return to the Paragon values.

FIG. 1a is a block diagram which schematically illustrates the method according to the preferred embodiment of the invention. The blocks indicate the functions performed by a general purpose computer preprogrammed to perform the program according to the invention. The script blocks 10 comprise the major data structure of the program and are grouped in a script matrix 10 consisting of a plurality of departure script blocks which in the preferred embodiment of the invention comprise Block 1, Block 2 and Block 3. In addition, the script matrix 10 includes a Paragon Block 12 and a critical block 14. A Script Manager function 16 navigates through the script matrix 10. Initially, the Paragon Block 12 is activated for generating base line patient vital sign data which is displayed on a screen These include blood pressure, pulse rate, temperature, end-tidal carbon dioxide (ET $CO_2$) and oxygen saturation ($SaO_2$). Prior to display, the vital sign data is acted upon by a "Check Modifiers" block 18 which can change the vital sign data in a manner analogous to that in which a patient's vital signs would be affected in the operating room by drug effects, mechanical ventilation effects, position effects, and the like. Every choice is randomized within limits so that no two Simulator runs are the same. A random number generator provides all of the program's randomness.

While a single departure script block matrix 10 is shown in FIG. 1, in actual practice, there will be a plurality of such script matrixes to simulate a plurality of mal-events or combinations of mal-events as might occur in an operating room while a patient is anesthetized. For example, FIG. 2 shows a script matrix comprising three scripts which are contemplated in the method according to the invention. These include malignant hyperthermia, embolism and acute surgical bleeding. Each of the malignant hyperthermia, acute surgical bleeding and embolism scripts is comprised of three script blocks, but can be expandable to any number.

Activation of the departure scripts is manifested by changes in the patient's vital sign data on the screen 17. User input (at user choice function 26) and its timeliness will determine the flow through the script blocks 10 until the sequence is terminated. The Script Manager 16 checks the status in each current script Block 1, 2 or 3 and, based on the user's input, determines whether to activate the next block above or below. Movement downward or minus indicates that the patient's condition is worsening and movement upward or plus indicates that the patient's condition is improving. The sequence ends when the patient's condition moves downward from script Block 3 to the critical block 14 or upward from script Block 1 to the Paragon block 12. Since there is no positive bridge from the critical block 14 to script block 3 downward the patient "dies" if the critical block 14 is reached. Changes in the patient's vital signs as indicated to the operator on screen 17 have three variables, that is, frequency, magnitude and direction of the change.

Null events 24 are issued by the computer when there are no other available events to process. At appropriate intervals or frequency, the new patient vital signs information are outputted, with the appropriate magnitude and direction.

FIG. 1b shows a general purpose computer which could be programmed to perform the method according to the invention. The computer includes a central processing unit (CPU) and a memory unit. The CPU outputs to the display screen 17. User interface and control may be in any conventional manner, such as by use of a "mouse".

Initially, the events are controlled totally by the program. The user choice routine 26 captures what the user inputs. For ease of use and to facilitate learning, the user's choice 26 may be implemented by means of the mouse and various options indicated on the screen 17. The Set Effects function 28 processes the user choices, sets appropriate variables and timing to reflect the choice, and sends these effects to Check Modifiers 14. If applicable to the current active script Blocks 1, 2 or 3, the user choice is also registered as contributing to improving or worsening the patient's condition so that the Script Manager 16 will evaluate the choice and its timeliness in assessing whether to activate the next script block above or below in the script matrix 10.

The script Blocks 1, 2 and 3 are organized into a script matrix which is a $10 \times 10$ two-dimensional matrix. Each script occupies a column, and each block is assigned a unique integer describing its location in the matrix. Moving down within the script means conditions are worsening and moving up means conditions are improving. Within the matrix, moving down is accomplished simply by incrementing the current block's number and moving up is accomplished by decrementing this number.

When a simulator session is commenced, the Paragon script is activated to portray a patient when first brought into the operating room. At a random time, the program activates a mal-event script, and depending on user actions and their timeliness, successively calls the script reflecting improved or worsened conditions. Thus, the patient will either progressively deteriorate and "die", remain stable, or improve and return to the base line or Paragon state. Real-time aspect of anesthetic practice is achieved by means of a timer which is started with the induction of anesthesia. All simulator events, such as posting of vital signs, messages to the user and the like, take place with reference to this timer. Realism is enhanced through a data panel which uses sound messages from the surgeon, a pulse-beat tied to the pulse oximeter, and inclusion on the screen of only those elements that can be seen at a glance in the operating room.

Figure 4:
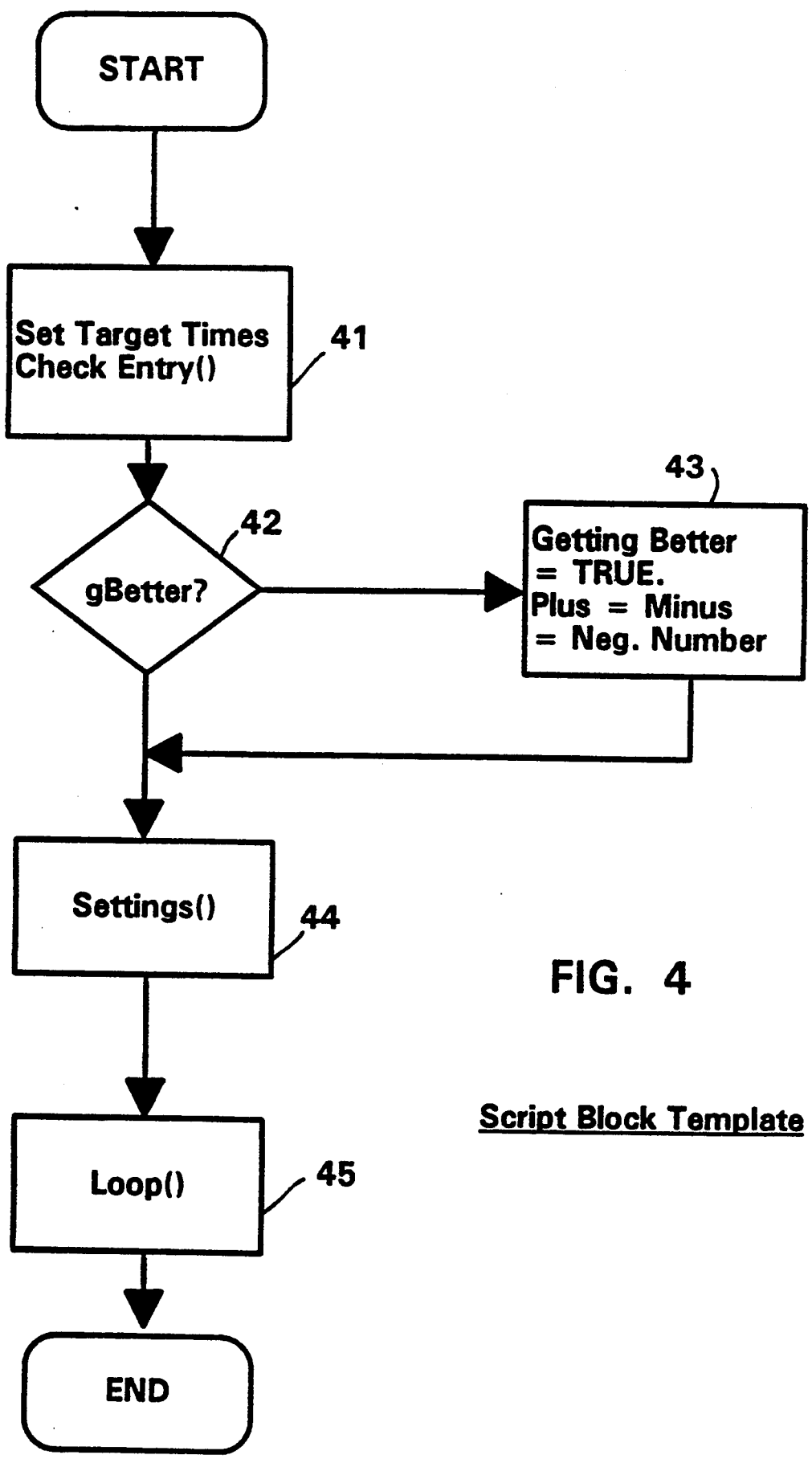
FIG. 4 shows a script block template for the general case as used in the method according to the invention.

The script block template is shown in FIG. 4. All scripts, except Critical and Paragon which will be described below, follow this same basic pattern. At a random time after the Paragon patient vital signs are displayed on screen 17, the script is started. At 41 and target times are set. These are times during the run of the script when the program checks to see if the user has completed an appropriate action. Check entry 41 determines whether the script was entered from above, indicating that the patient's condition is worsening, or from below, indicating that the patient's condition is improving. After Check Entry, the program looks at gBetter 42 which is a global variable that the Script Manager 16 looks at to determine which script to activate next. If gBetter is true, that is, the patient's condition is improving, the local variable GettingBetter is set to true at 43 and both the plus and minus are set to negative numbers so that the block will exit only after the time limit is reached. On the other hand, if gBetter is not true, both plus or minus are zero or positive. Plus and minus are used to "score" the user's performance and when either gets to a threshold value, the block exits and gBetter is set accordingly. If neither reaches the threshold, the block waits until its time limit is reached, and then exits, as will be discussed in greater detail below. Both plus and minus are set up so that the user gets "credited" for correct actions and another chance to "do the right thing" in subsequent script blocks.

Settings 44 is then called to set the magnitude, frequency, and direction of changes in the patient vital signs which are blood pressure, end-tidal $CO_2$, oxygen saturation, temperature and pulse. The settings depend upon the value of the gBetter since the transient values are different depending upon whether conditions are improving or worsening. Loop 45 is the function in which the user may take action and in which the user's performance is rated. Upon return from loop 45, the block exits.

Figure 5:
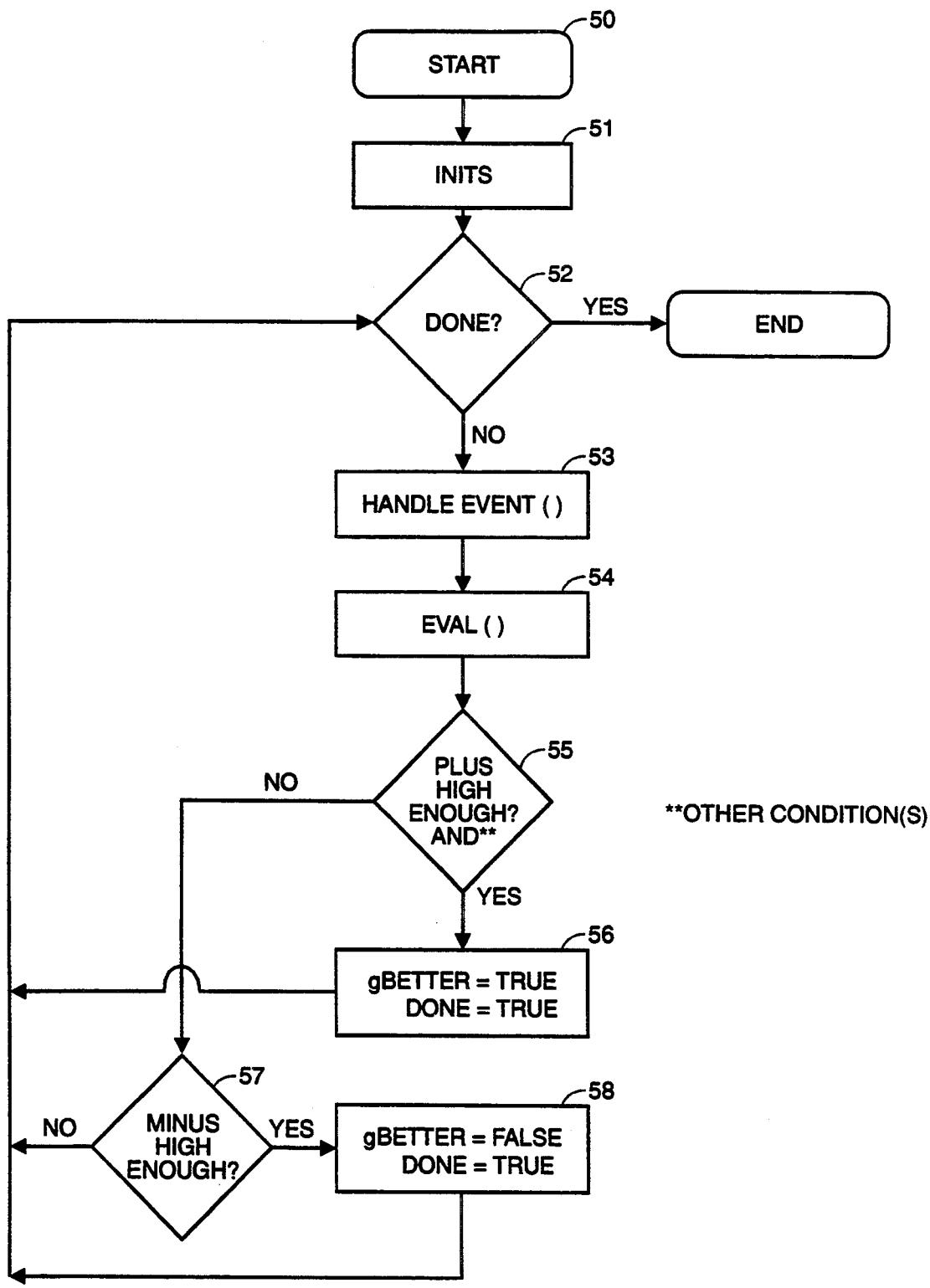
FIG. 5 is the general case loop function template employed in the method according to the invention.

The general case loop function template is shown in FIG. 5. Inits 51 are any initializations unique to the script in question. For example, the setting of the variable "bleedingControlled" in the intraoperative bleeding script. This is randomized to true or false and parallels the real situation in which the surgeon may loose control of the vessel without ever getting control of the blood loss. Done 52 has a value which is actually a composite of the flags Done, a local variable which terminates the local loop, and gDone a global which is set to true if the user picks Quit from the file menu. If Done is true, the loop function template exits at 52. If not true, HandleEvent is activated. This function provides the user, the program and the operating system a chance to act. Examples are null events which are used to post new numbers, mouse-down events from user choices and operating system functions. Eval 54 is the function which evaluates user performance as will be discussed below. After Eval, Plus 55 is examined to see if it is at a threshold and whether any special conditions are satisfied, such as, for example, bleedingControlled as described above. If so, both gBetter and Done are both set to true at 56 and the loop will terminate with gBetter acting as the flag that allows the Script Manager 16 to activate the appropriate next script. If plus is not at a threshold, minus is checked at 57. If minus is at a threshold. gBetter is set to false and Done is set to true at 58, causing loop termination with the flag indicating worsening conditions and the activation of the next appropriate script. If minus is not at threshold, the program loops back to Done 52.

Figure 6:
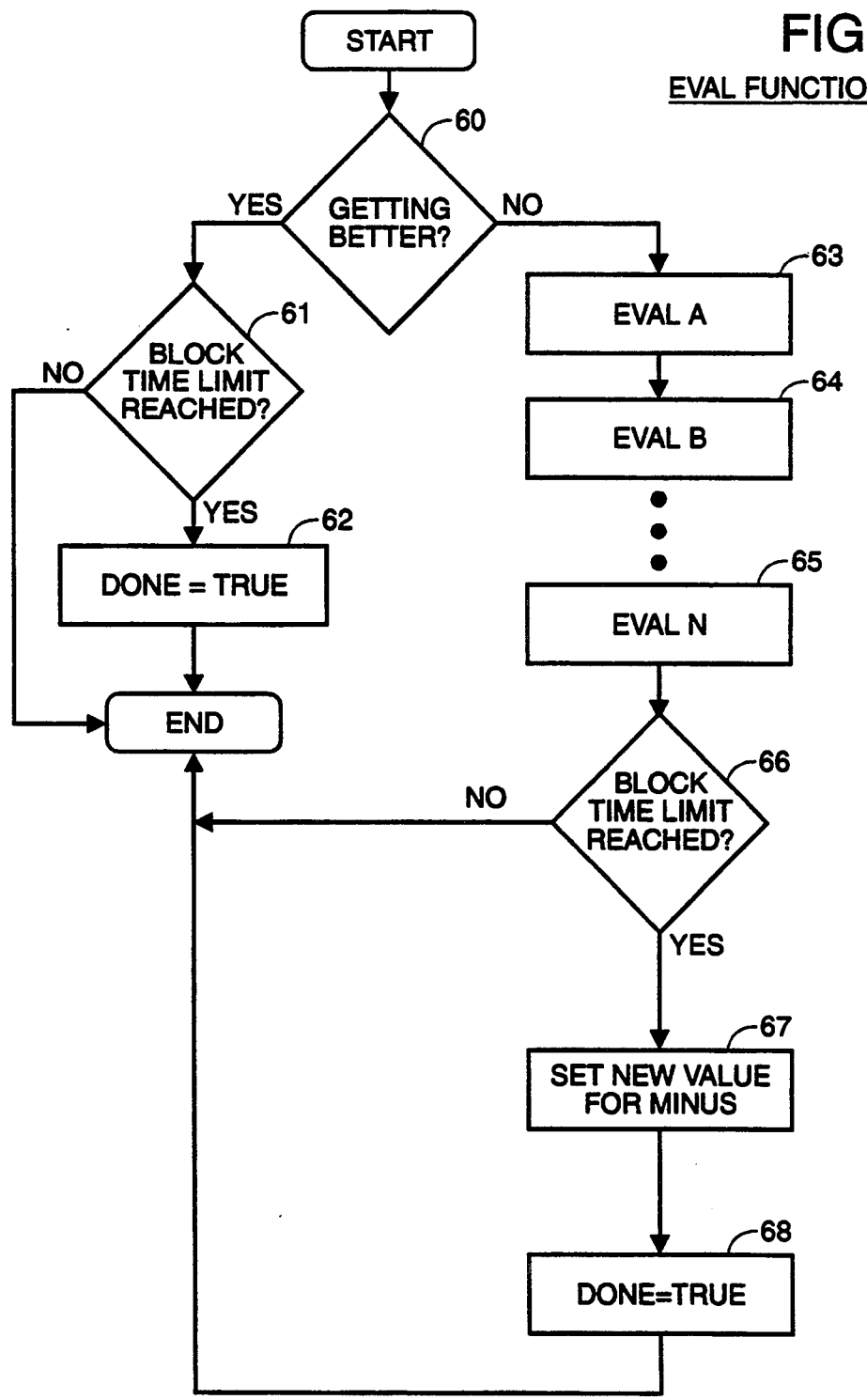
FIG. 6 illustrates the general case evaluation function template of the method according to the invention.

The Eval function template is shown in FIG. 6. Initially, GettingBetter is tested. If true, and the block time limit is reached at 61, then Done is set to true at 62 and the Eval template will exit to 55 of FIG. 5. However, if GettingBetter is false, then the program enters a series of evaluations such as EvalA 63, EvalB 64, to EvalN 65, there being one evaluation for each looked-for user action. Each Eval has a flag which is set at completion so that it is not reentered during the run of the block.

Figure 6A:
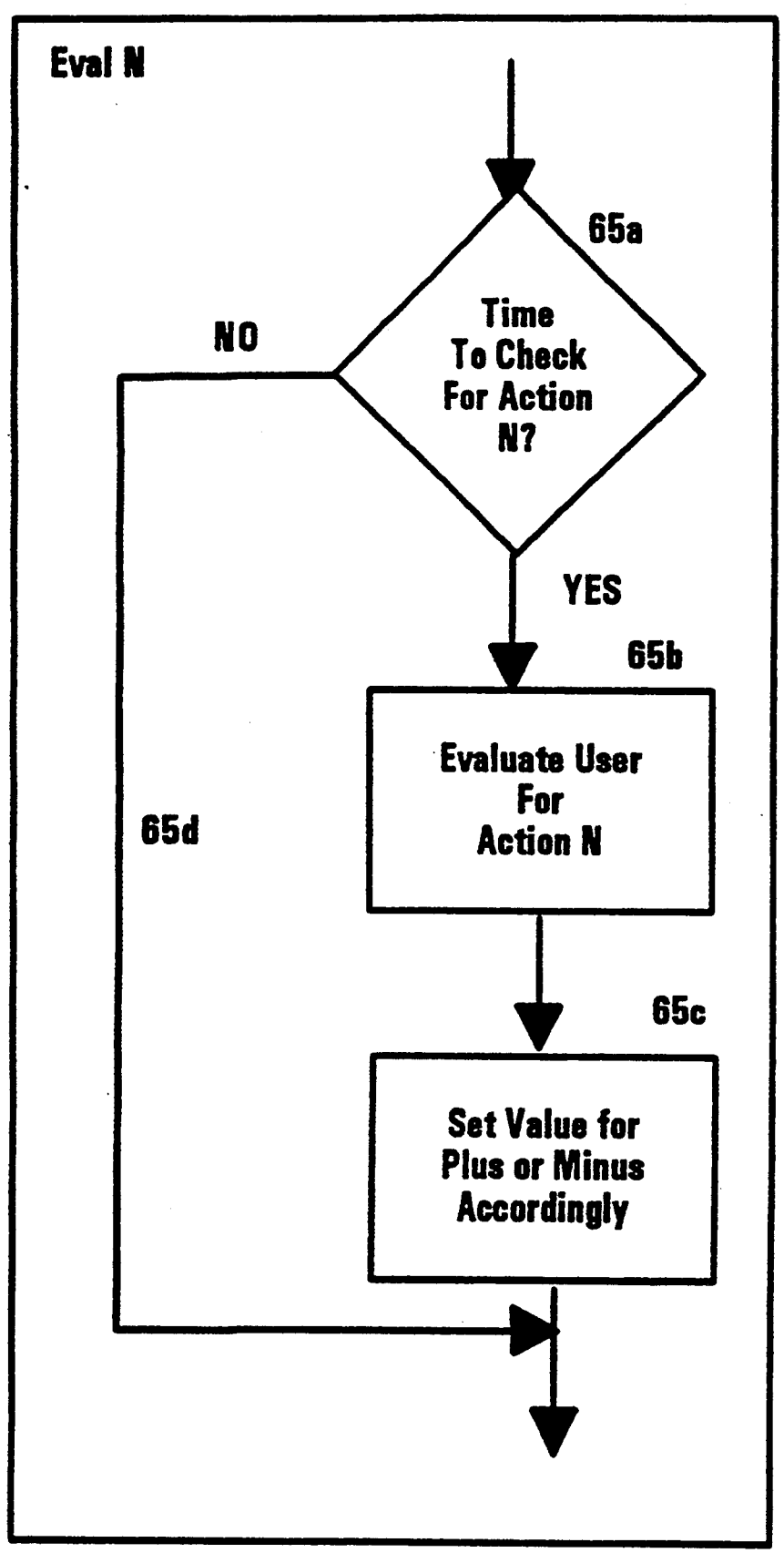

A typical evaluation, EvalN 65 is shown in FIG. 6a. First, at 65a the time is checked to see if the time to check the user action has arrived. If so, the program looks to see whether or not the user has completed the desired action at 65b and plus and minus are changed accordingly at 65c. If the time to check has not arrived at 65a, the next succeeding evaluation is entered through 65d. After the completion of the evaluations, the block's total time limit is checked at 66. If that time has passed, minus is reset at 67 so that it reaches the threshold since reaching this point means that the user did not take actions that would have led either plus or minus to reach their thresholds. In other words, the user waited too long, so that Done is set to true at 68 and the block will exit with gBetter set to false, that is, the patient's condition will worsen. The timer set for action are average times in which the required action must be taken to be effective and use based on operating room experience.

Figure 7:
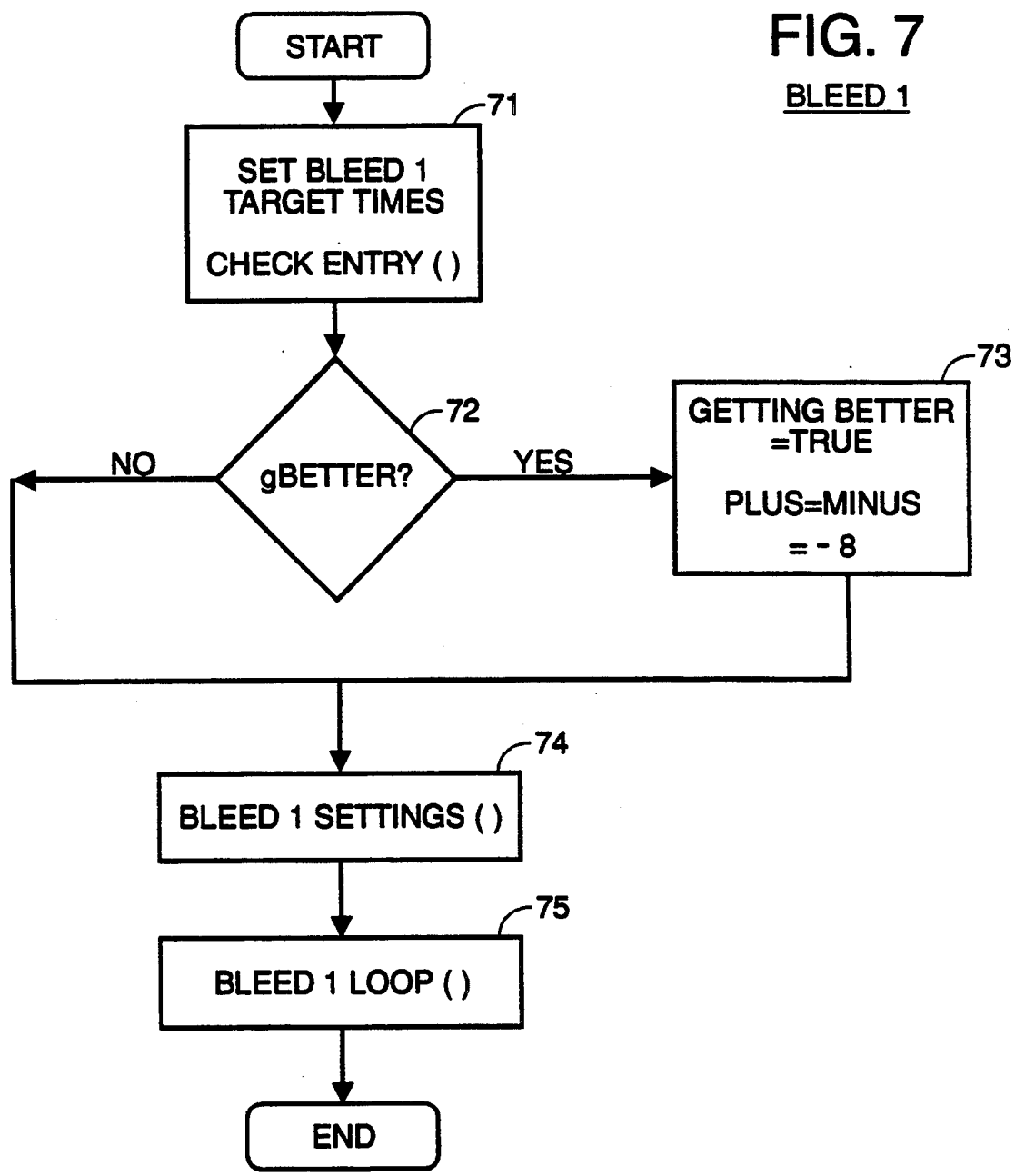
FIG. 7 shows an acute surgical bleeding script block based in the template of FIG. 4.

FIG. 7 is similar to FIG. 4 except that it is a specific example of a script based on the template, which in this case is Bleed 1 or the first script block in the bleed script. It will be appreciated that the second and third script blocks in the bleed matrix are similarly configured. Here, the target times are set at 71 and gBetter is checked at 72. If gBetter is true, plus and minus are set to minus 8 at 73. The bleed setting at 74 sets the magnitude, frequency and the direction of the bleed 1 vital signs.

Figure 9A:
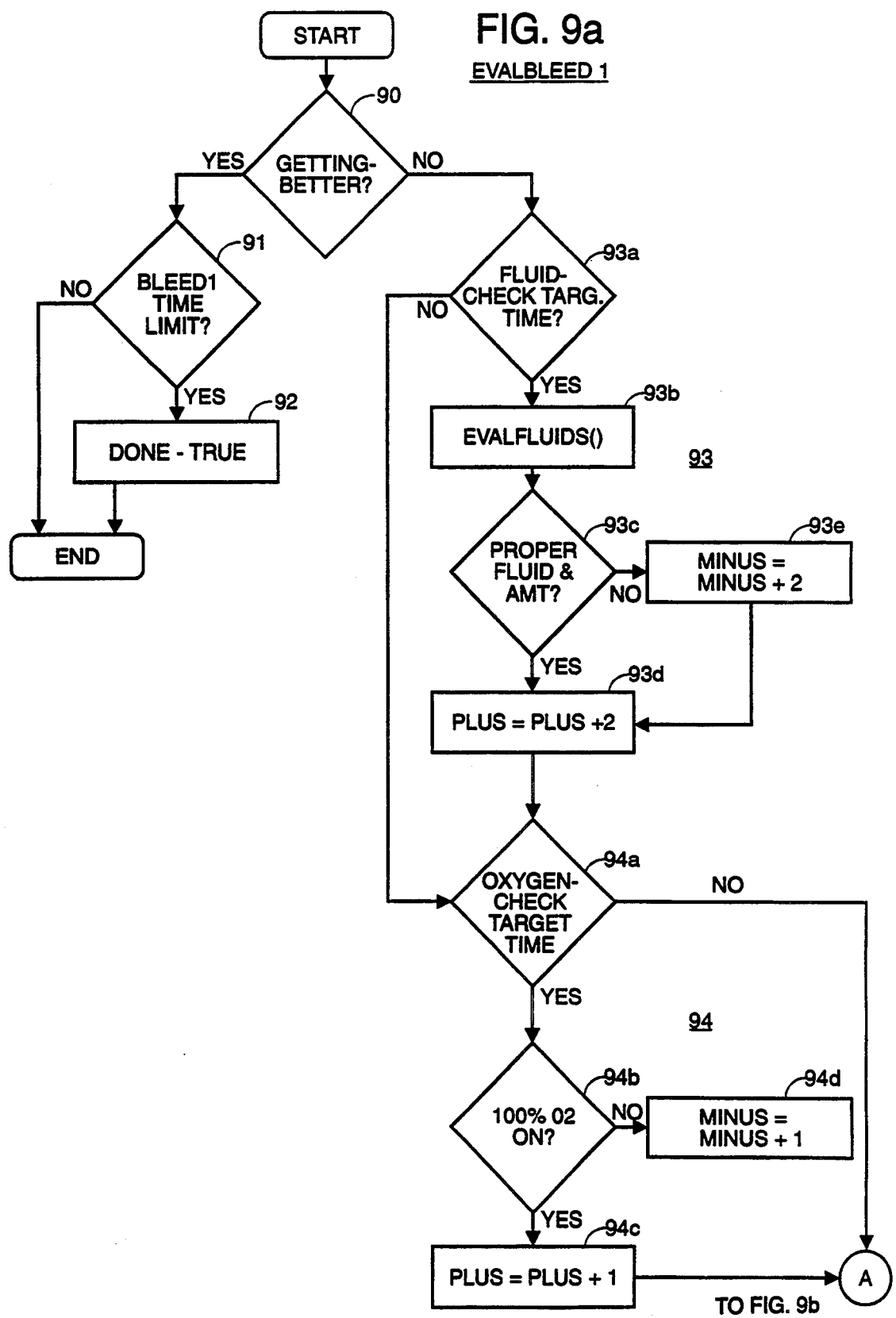
FIGS. 9a and 9b show acute surgical bleeding evaluation template.
Figure 9B:
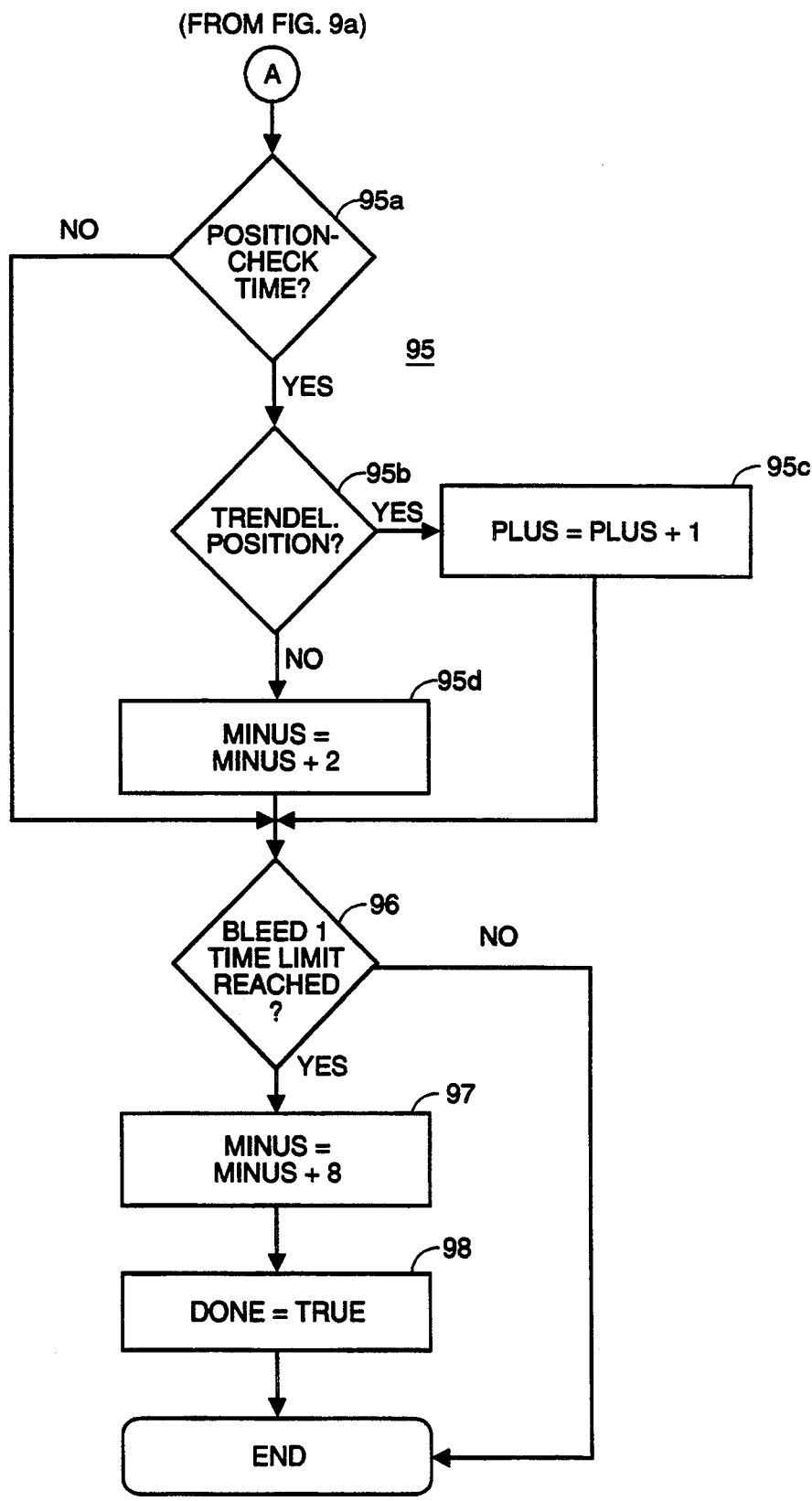

The Bleed 1 loop 75 is shown in FIG. 8, and FIGS. 9a and 9b are the evaluation function for the Bleed 1 loop 75. In FIG. 8, the variable bleedingControlled is randomly set at 81. If Done is set to True at 82, the loop exits. If not true. HandleEvent 83 is called. This function provides the user, the program and the operating system time to act. The Eval Bleed function 84 is shown in FIGS. 9a and 9b. Plus is checked at 85 to see if it has reached its threshold (5), and minus is checked at 87 (its threshold is 8). The "and the other conditions" at 85 is bleedingControlled and must be true for the user's action to do any ultimate good. That is, the patient will worsen despite the user's best effort if the surgeon cannot control bleeding. If bleeding is controlled and Plus has reached threshold, both gBetter and Done are set to true and the script block will terminate with gBetter acting as a flag that allows the Script Manager 16 to activate the next script. If plus is not at the threshold of five or the bleeding is not controlled, minus is checked at 87 and if at the threshold of eight, gBetter is set at false and Done is set to True at 58 causing loop termination with the flag indicating worsening conditions. On the other hand, if the minus is not at the threshold, the program loops back to 82.

With reference to the EvalBleed1 function shown in FIG. 9, gBetter is examined at 90. If GettingBetter is true, the template proceeds to 91 which determines whether the bleed time limit has been exceeded. If false, the template exits and if true, Done is set to true and the template exits. If GettingBetter is not true, the template proceeds through three evaluations: fluid check 93, oxygen check 94 and position check 95.

At 93a, the program determines whether the user has given a bolus of the correct fluid within the target time. If false, the program proceeds to the oxygen evaluation 94. If fluids have been delivered within the target time, at 93b the program evaluates whether the proper fluid was delivered and if so whether the amount was proper at 93c. If the operator completed the appropriate action at the set time provided, plus is increased by two at 93d and the next evaluation is entered. However, if the user did not complete the appropriate action, minus is increased by two at 93e.

The next evaluation at step 94a and 94b are whether the operator is giving the patient 100% oxygen within the target time. If the oxygen target time check is true and 100% oxygen is being delivered, plus is incremented by one at 94c and if non true, minus is increased by one at 94d.

The third evaluation shown in FIG. 9b tests whether the user has put the patient in a head-down position (Trendelenberg Position-Trendel) within the target time at 95a and 95b. This is necessary in order to increase the blood pressure which is lowered by blood loss. If true, plus is incremented by one at 95c and if not true, minus is increased by two at 95d.

Finally, the Bleed 1 Time Limit is tested at 96. If it has been reached, minus is increased by 8 at 97 and thus reaches the threshold. Done is set to true at 98 and on return to Bleed 1 loop, the loop will exit with gBetter set to false at 88 in FIG. 8. On the other hand, if the time limit has not been reached at 96, EvalBleed1 exits, and another Bleed 1 loop iteration will start.

Figure 10:
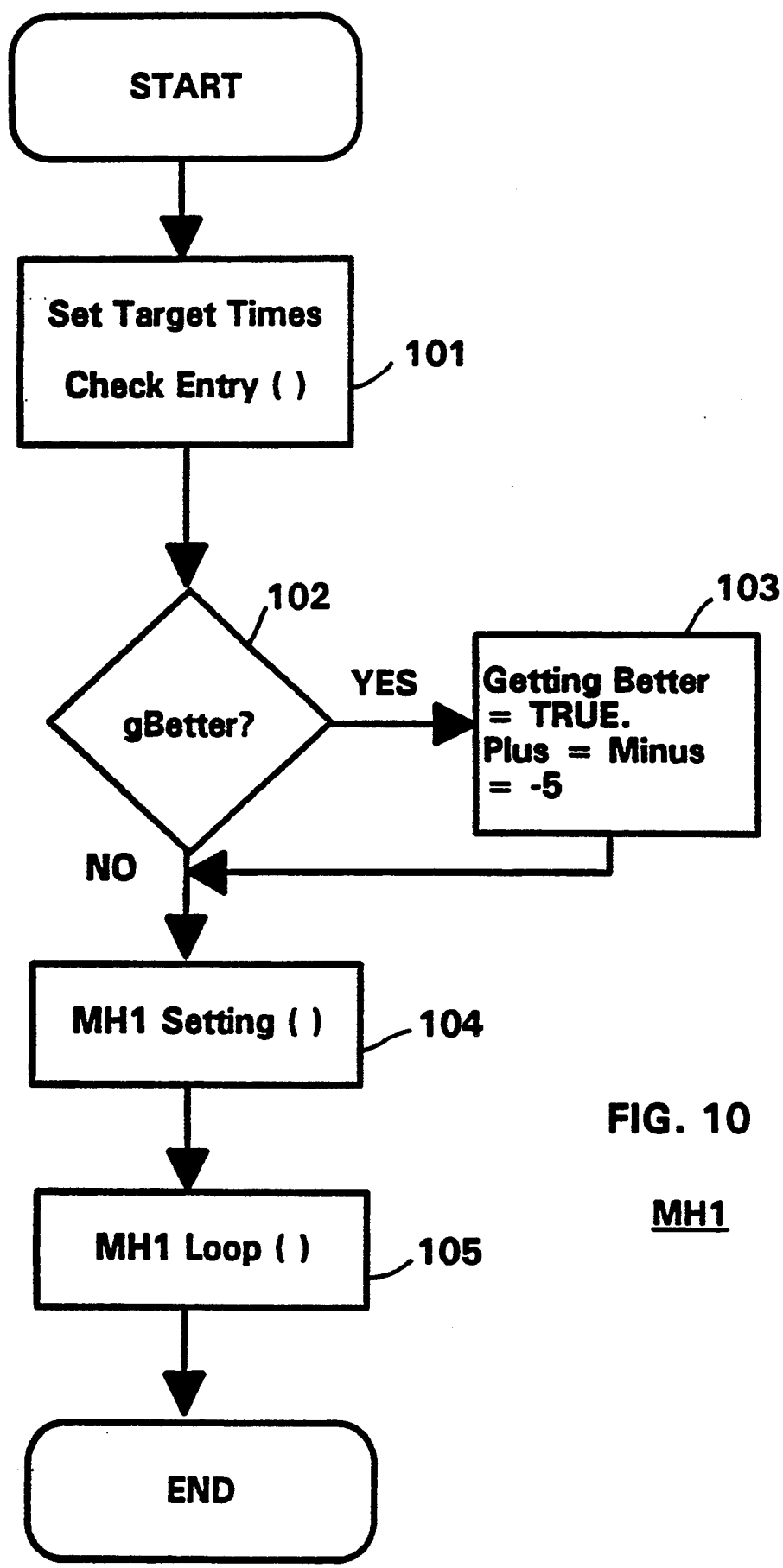
FIG. 10 shows a malignant hyperthermia script block.
Figure 11:
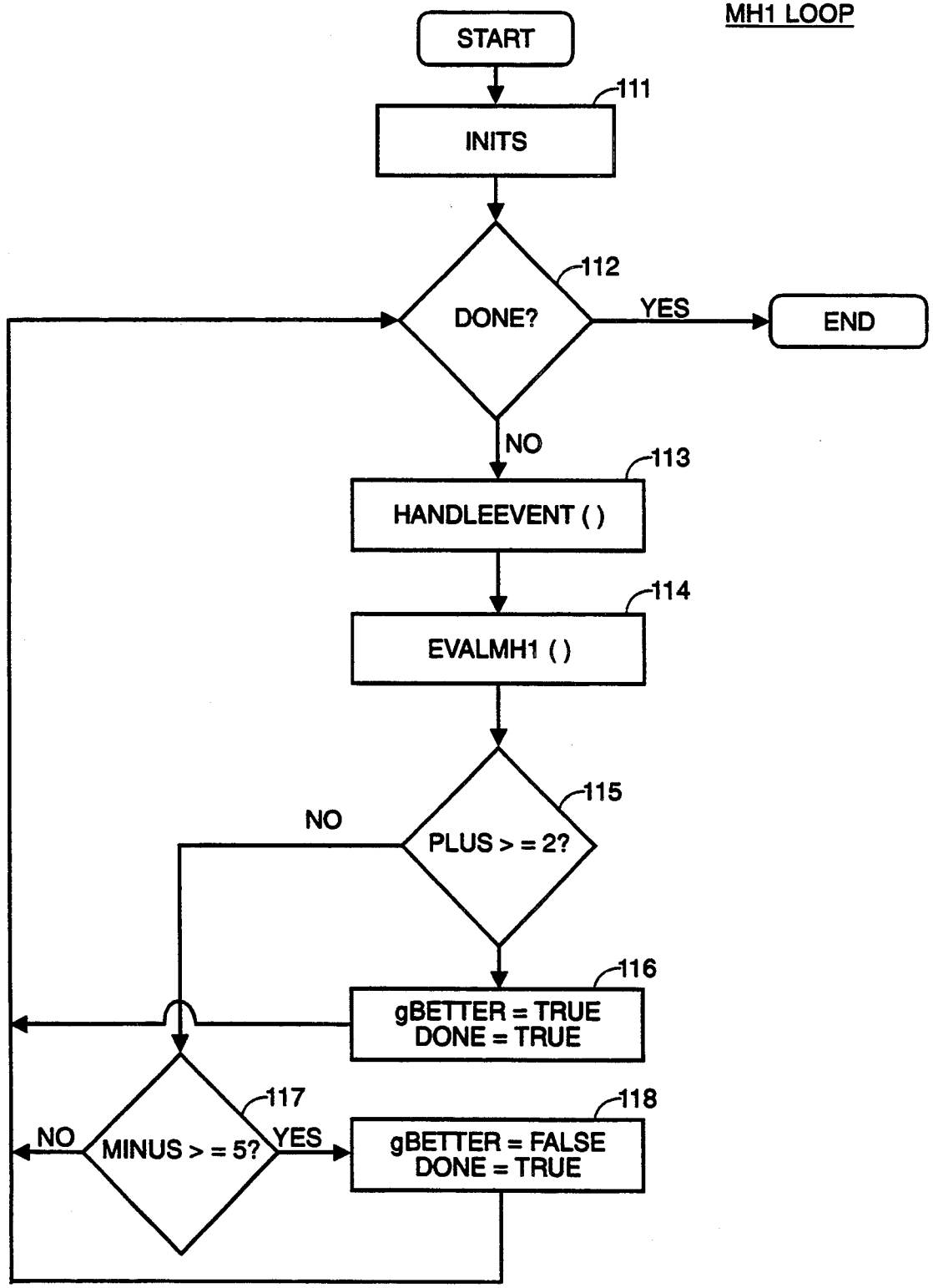
FIG. 11 shows a malignant hyperthermia loop block.

FIG. 10 shows the script for malignant hyperthermia or MH1. Similar scripts are employed for MH2 and MH3, the second and third script blocks for the malignant hyperthermia script. The MH1 loop is shown in FIG. 11 and the evaluation template in FIGS. 12A and 12B. It can be seen that FIG. 10 follows the pattern of FIG. 4 and the loop of FIG. 11 follows the pattern of FIG. 5 and accordingly the discussions relative to FIGS. 4 and 5 are applicable to FIGS. 10 and 11, respectively. The threshold for plus at 115 in FIG. 11 is set at two and the threshold for minus at 117 is set at five.

Figure 12A:
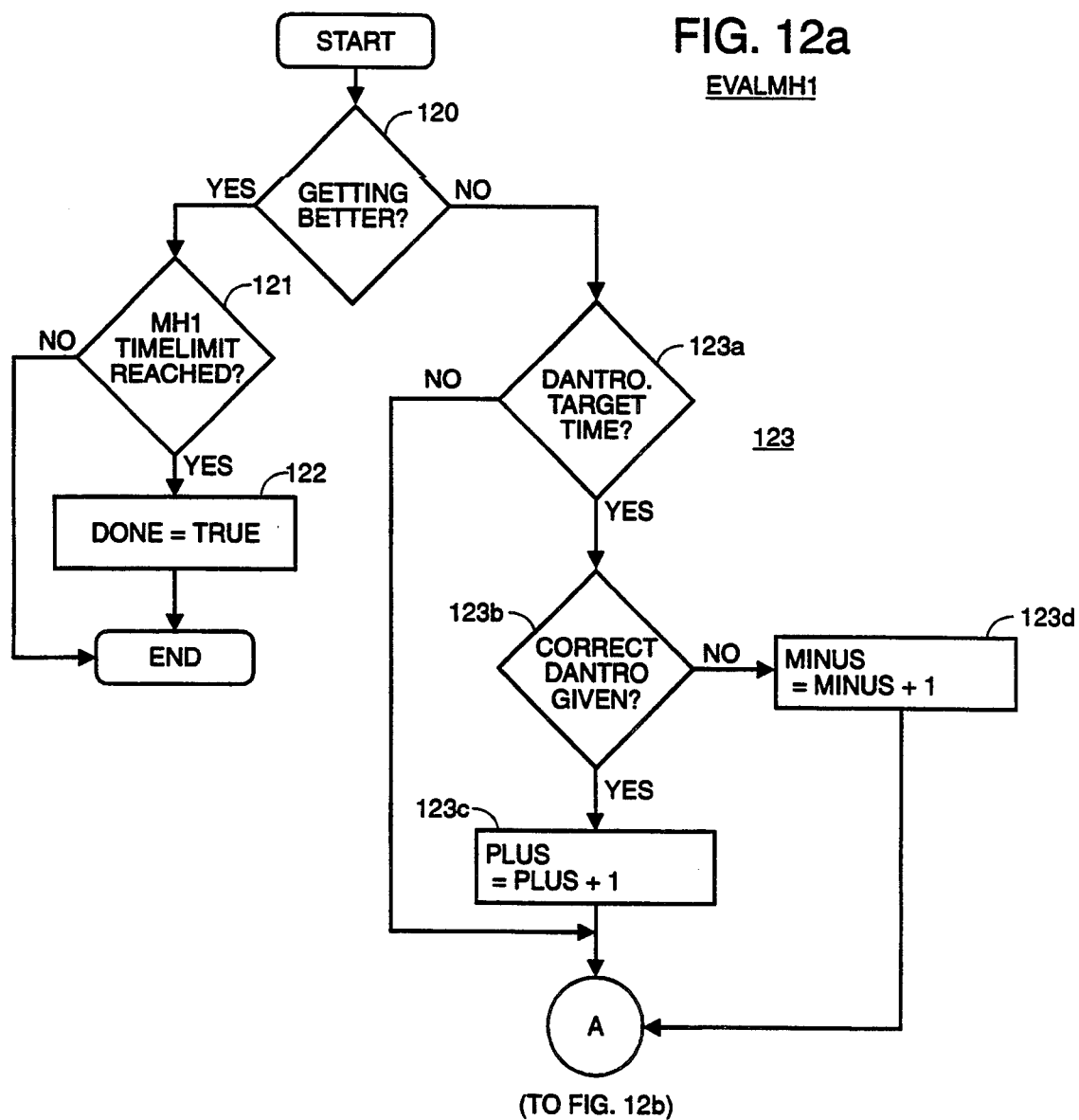
FIGS. 12a and 12b show the malignant hyperthermia evaluation.

Referring now to FIG. 12a, Eval MH1 contains two evaluations. The first at 123 determines if the user has given Dantrolene and at 124 whether the vapor anesthetic has been turned off. Dantrolene is a drug which can stop an attack of malignant hyperthermia. At 123a the program determines whether the drug was given within the correct target time and at 123b whether the dosage was appropriate. If true, plus is incremented by one at 123c and if not true, minus is incremented by one at 123d.

Figure 12B:
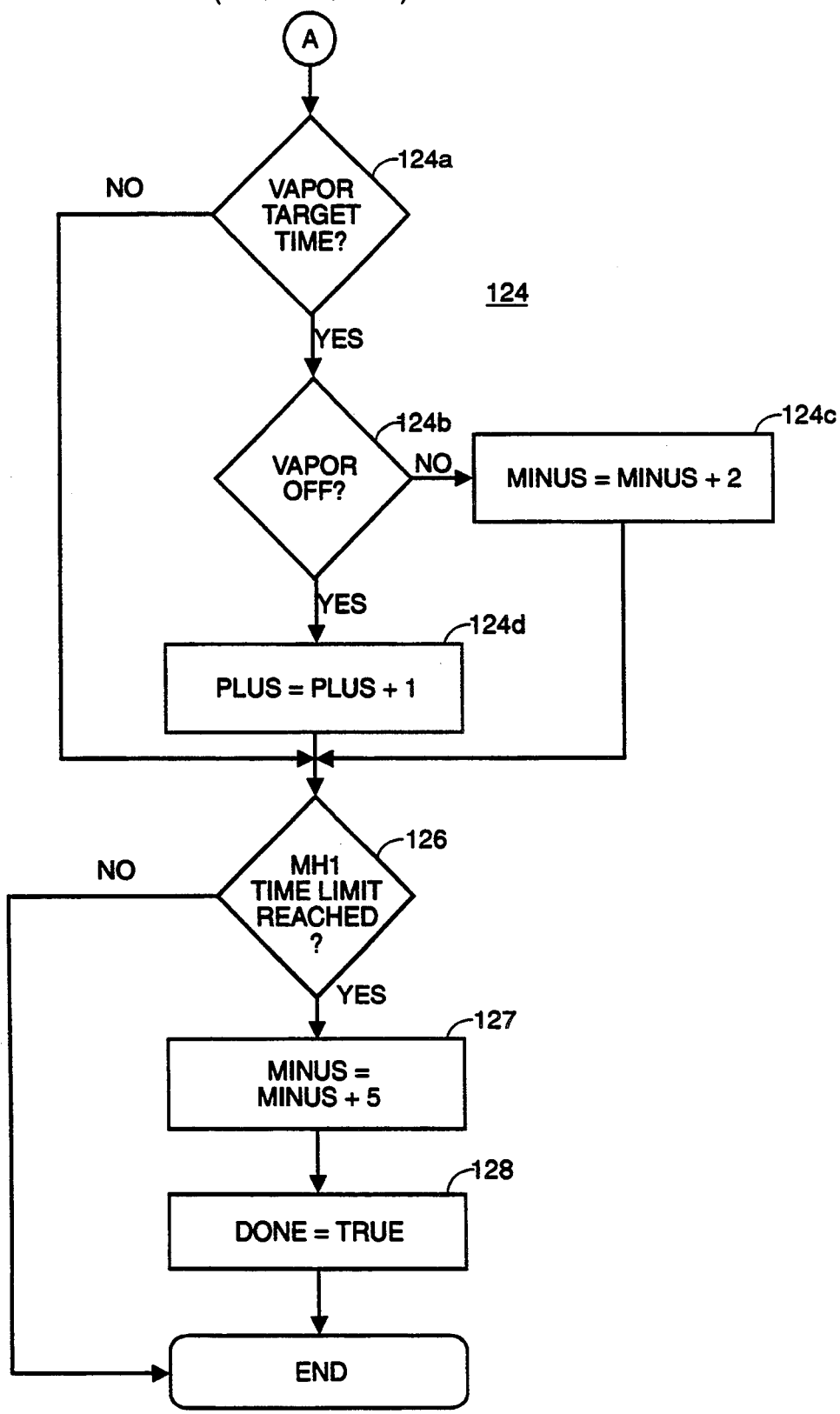

With reference to FIG. 12b, it is determined at 124a whether the vapor anesthetic be turned off within the target time. This is important because these gases are powerful malignant hyperthermia triggers. If the vapor is off, plus is incremented by one at 124d and if not, minus is incremented by two at 124c. The program then determines at 126 whether the MH1 time limit has been reached and if so, minus is incremented to the threshold level of five and Done is set to true at 128. However, if the time limit has not been exceeded, the evaluation loop just exits.

Figure 13:
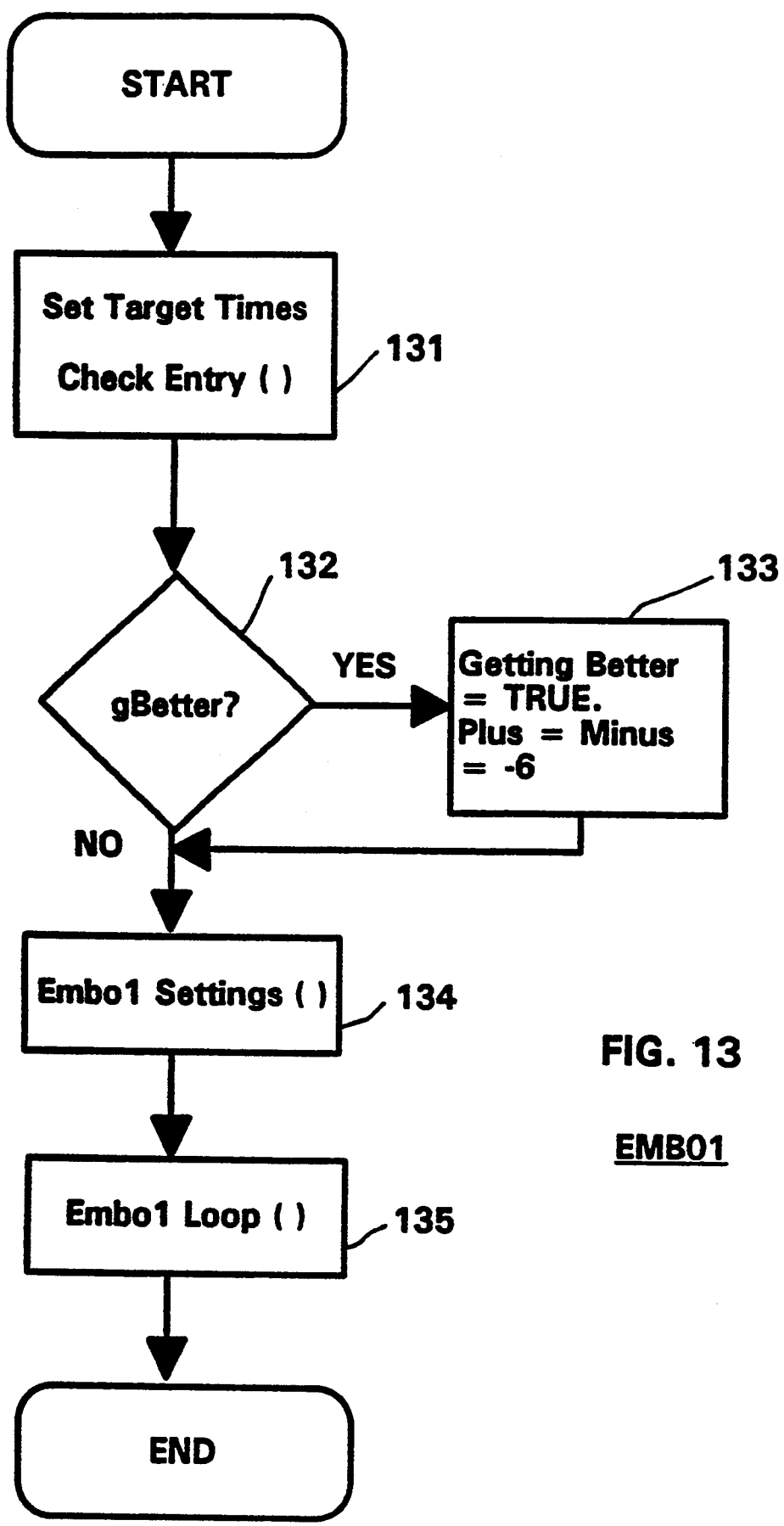
FIG. 13 shows embolism script block.
Figure 14:
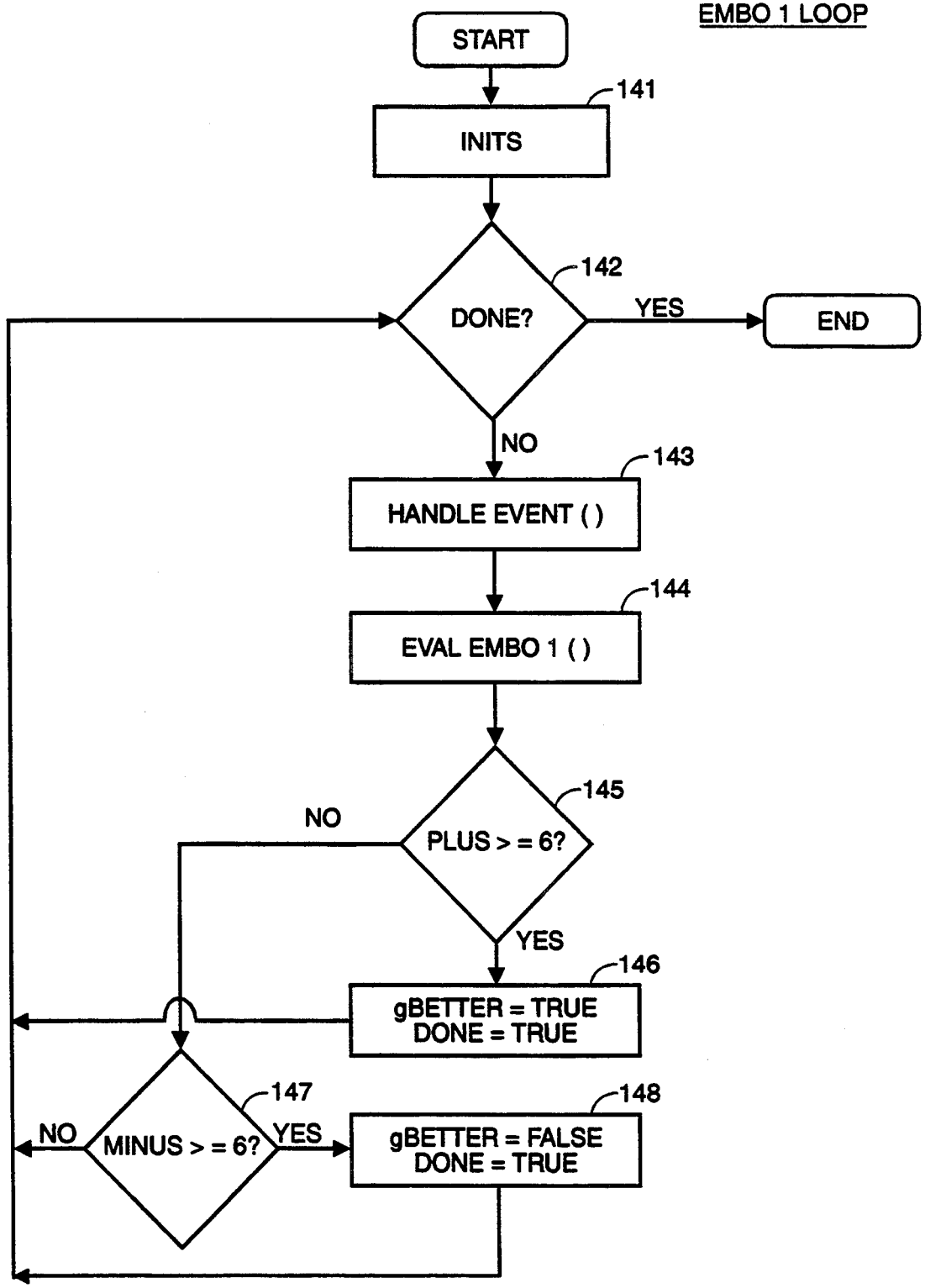
FIG. 14 shows embolism loop block.
Figure 15A:
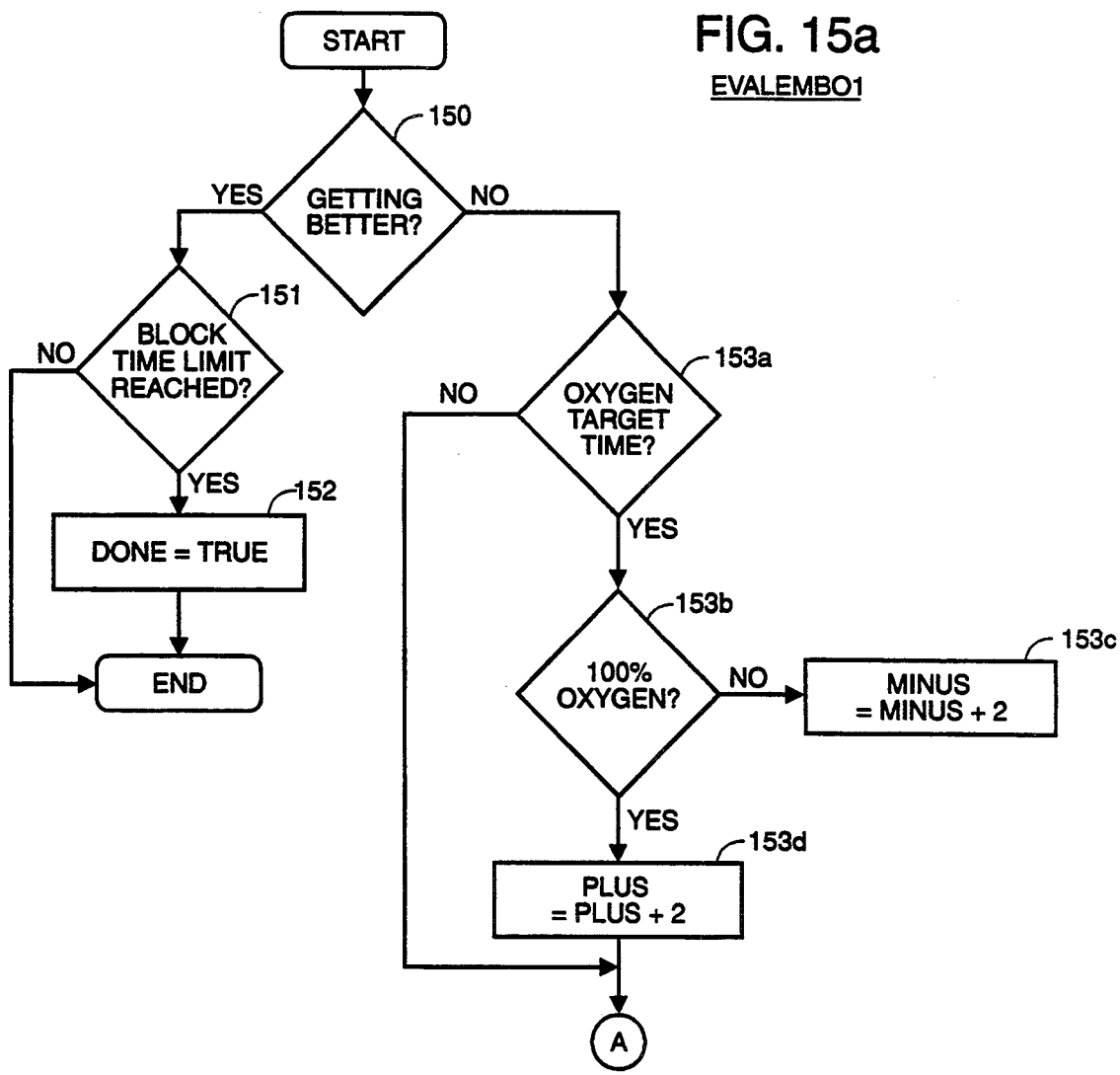
FIGS. 15a and 15b show embolism evaluation block.
Figure 15B:
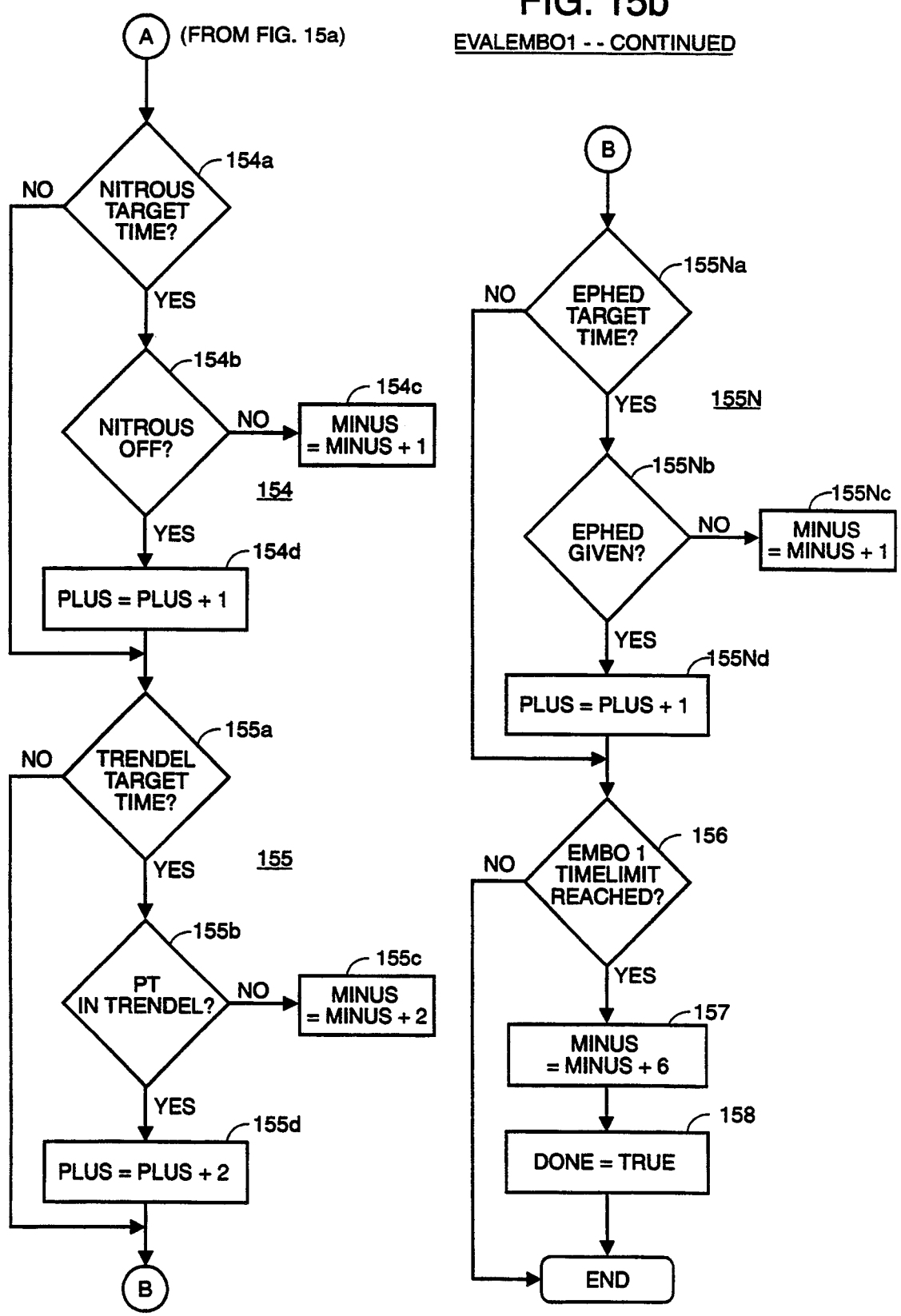

The first script block template for embolism (Embol) is shown in FIG. 13. The loop for Embol is shown in FIG. 14 and the Eval function for Embol is shown in FIG. 15a and 15b. The discussion of the general case templates of FIGS. 4, 5, and 6 are applicable to FIGS. 13 and 14 and accordingly this discussion need not be repeated.

At the start of EvalEmbol shown in FIGS. 15a and 15b, GettingBetter is examined. If true, the program determines if the block time limit has been reached at 151. If not, the evaluation exits. If the time limit has been reached, Done is set at true and the evaluation ends. If GettingBetter is false at 150, EvalEmbol looks for the following actions: 100% oxygen at 153; nitrous oxide off at 154, since nitrous oxide can increase the size of some emboli; Trendelenberg position at 155; and Ephedrine, which raises blood pressure, given at 155N. In each case the user must act within the target time or the program proceeds to the next evaluation. In particular, if the target time has been reached at 153a, the program determines if the user has set 100% oxygen at 153b. If not, minus is increased by 2 at 153c, and if so, two is added to plus at 153d. Next the nitrous oxide target time is checked at 154a. If that time has been reached, the program determines whether the nitrous oxide is off. If false, plus one is added to minus and if true, plus one is added to plus. Next, the program determines whether the patient has been placed in the Trendel position at the target time set at 155a and 155b. If false, minus is increased by two at 155c and if true, plus is increased by two.

The program then proceeds to the next evaluation which is the administration of Ephedrine. At 155Na, the program checks the Ephedrine target time. If the operator does not administer Ephedrine within the target time, the program proceeds to the next evaluation. If the target time has arrived, the program proceeds to 155Nb to determine if the Ephedrine has been given. If false, minus is incremented. If true, plus is incremented. The program then proceeds to 156 to determine if the Embol Block time limit has been reached. If not, EvalEmbol exits. However, if true, minus is increased by six which is minus's threshold and Done is set to true.

Figure 16:
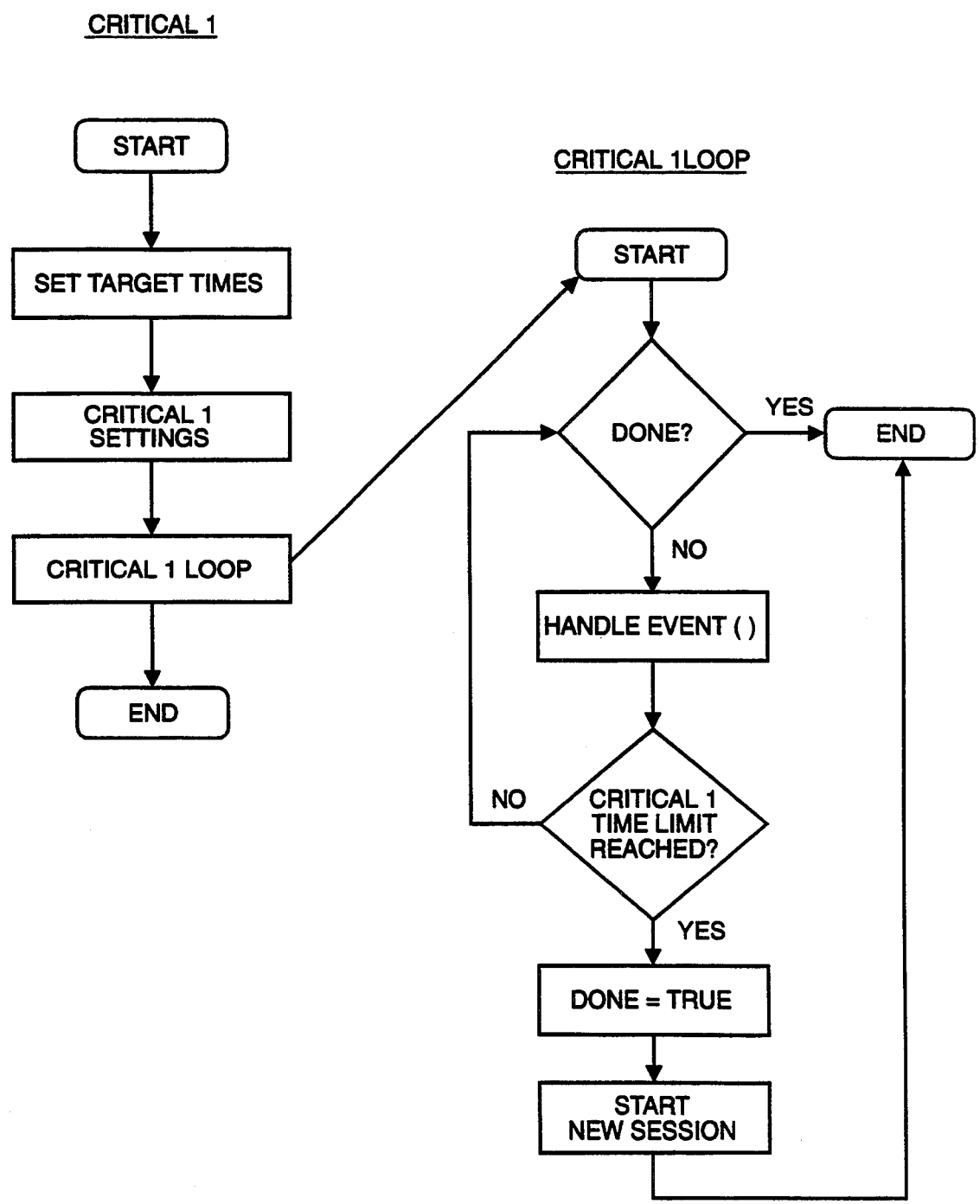
FIG. 16 shows the critical loop block.

The Critical1 script is shown in FIG. 16. This script departs from the script template in that there is no way to improve conditions if the user ends up in the critical loop. Thus, the script merely reflects total cardiovascular collapse, a "final pathway" that all scripts can follow. The function Critical 1 Settings sets all values, magnitudes of change and direction of change to reflect the collapse and eventual death of the patient. Critical 1 loop checks only for the randomized and preset time limit at which the simulator starts a new session with a new patient.

The Paragon script also departs from the pattern in that it merely sets average frequencies of change and magnitudes of change for vital signs all randomized within limits. All directions are set to neutral except for temperatures direction, which is set to "down" since a slight slow drop is normally seen in operating rooms if warming devices are not used.

Each of the departure scripts in the script matrix, for example, MH1, MH2, and MH3, have the same forms. However, the magnitude of the changes in the vital signs in each script is not the same. For example, in MH2, the pulse rate rises more rapidly and severely as do the changes in end-tidal $CO_2$ and oxygen saturation than in MH1. Also, the temperature, which is constant or slowly decreasing for MH1, begins to rise in MH2. This temperature rise is more rapid and steep in MH3. Similarly, the scripts for malignant hyperthermia and acute surgical bleeding will have the same forms in each script block but the frequency magnitude and direction of changes in vital signs may vary from script block to script block.

Figure 17:
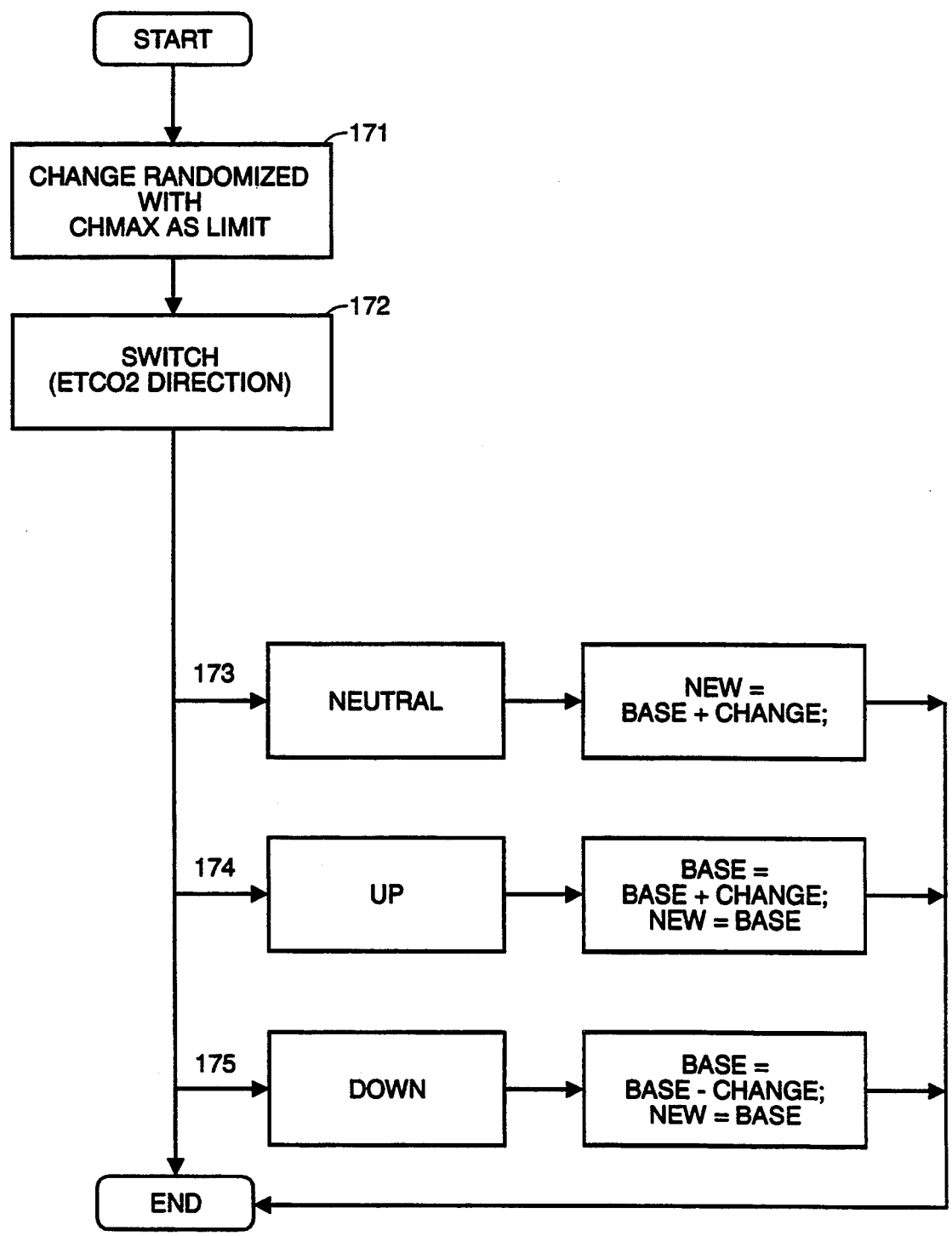
FIG. 17 is a function showing the end-tidal $CO_2$ which is typical for the vital sign functions.

The script for a typical vital sign, in this case end-tidal $CO_2$, is shown in FIG. 17. Parameters passed to these functions are amount of change and direction of change from the previous value while frequency of change is passed to HandleNull as described above. Initially, the local variable Change is randomized using the passed parameter ChMax as the upper limit at 171. Flow then moves to a switch statement with the reference variable EtCo2Direction 172. At 173, 174, and 175, the three possible values for the direction are shown. That neutral, up or down. If the direction is neutral, the new base number is the base (old) number plus the change. Change is also randomized at this point to a positive or negative number, making the output vary up and down a little. If the direction is up, change is added to the base, and the new number is the new base. If the direction is down, change is subtracted from the base and the new number is the base. A function for comparing this new number to preset maximums and minimums is called before the output reaches the screen.

Figure 18:
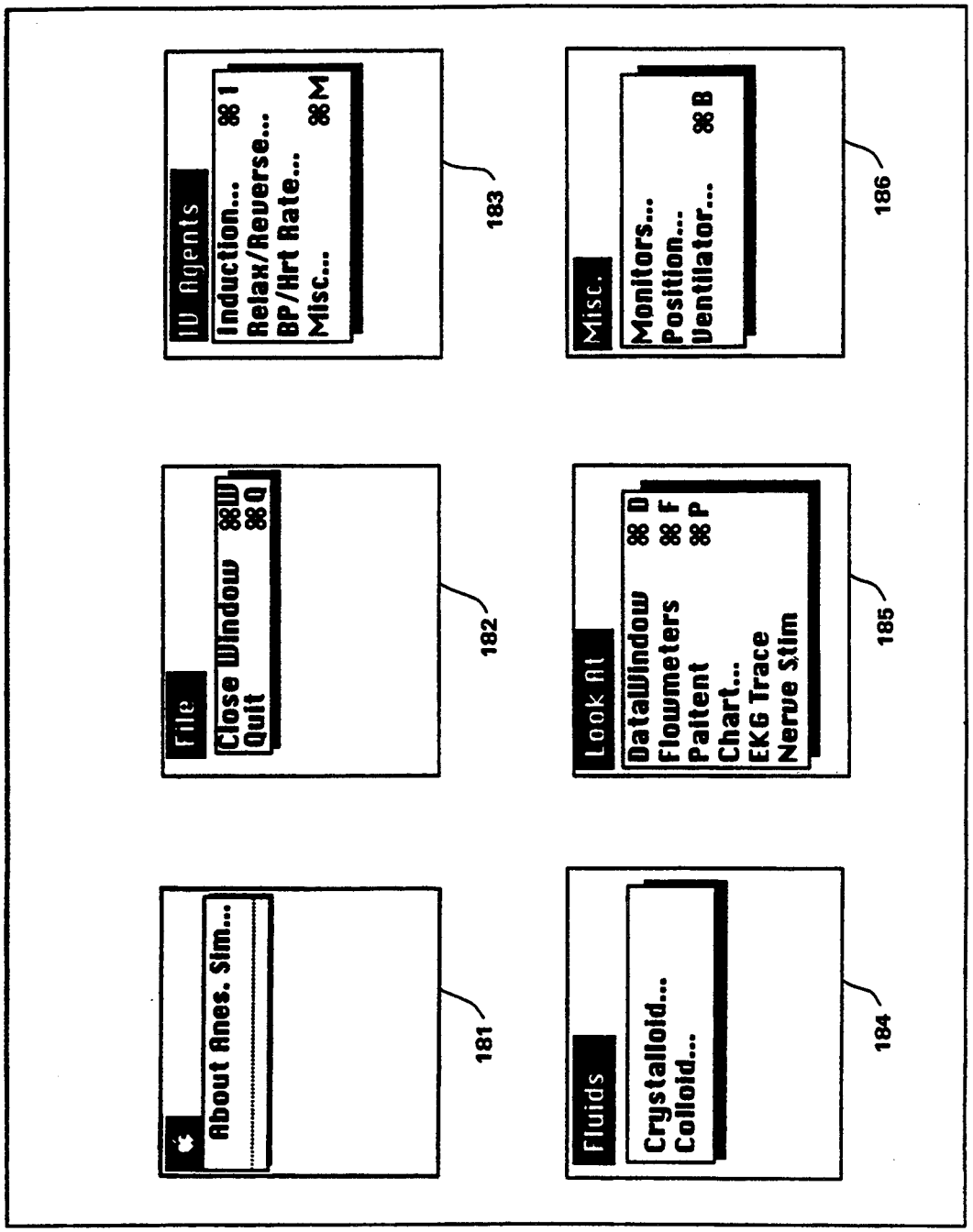
Figure 21:
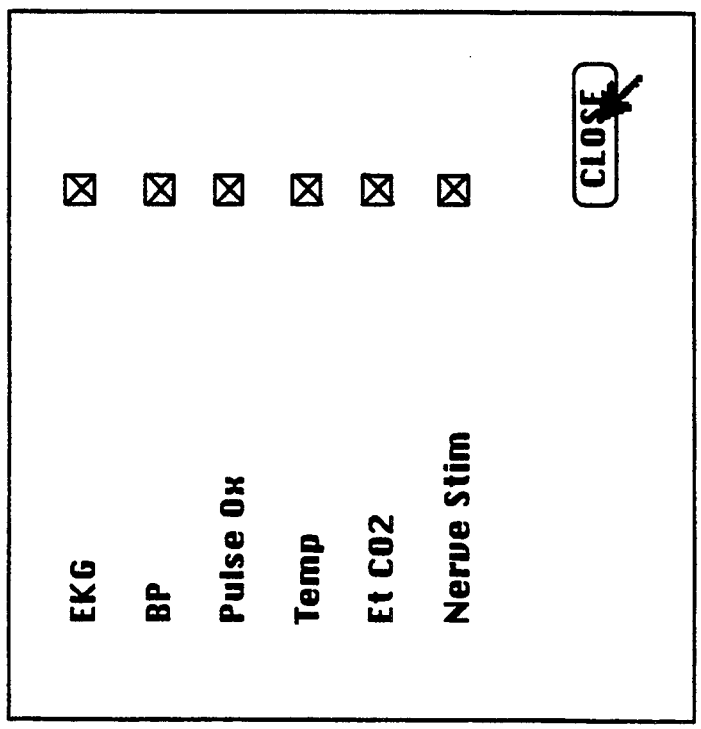
Figure 22:
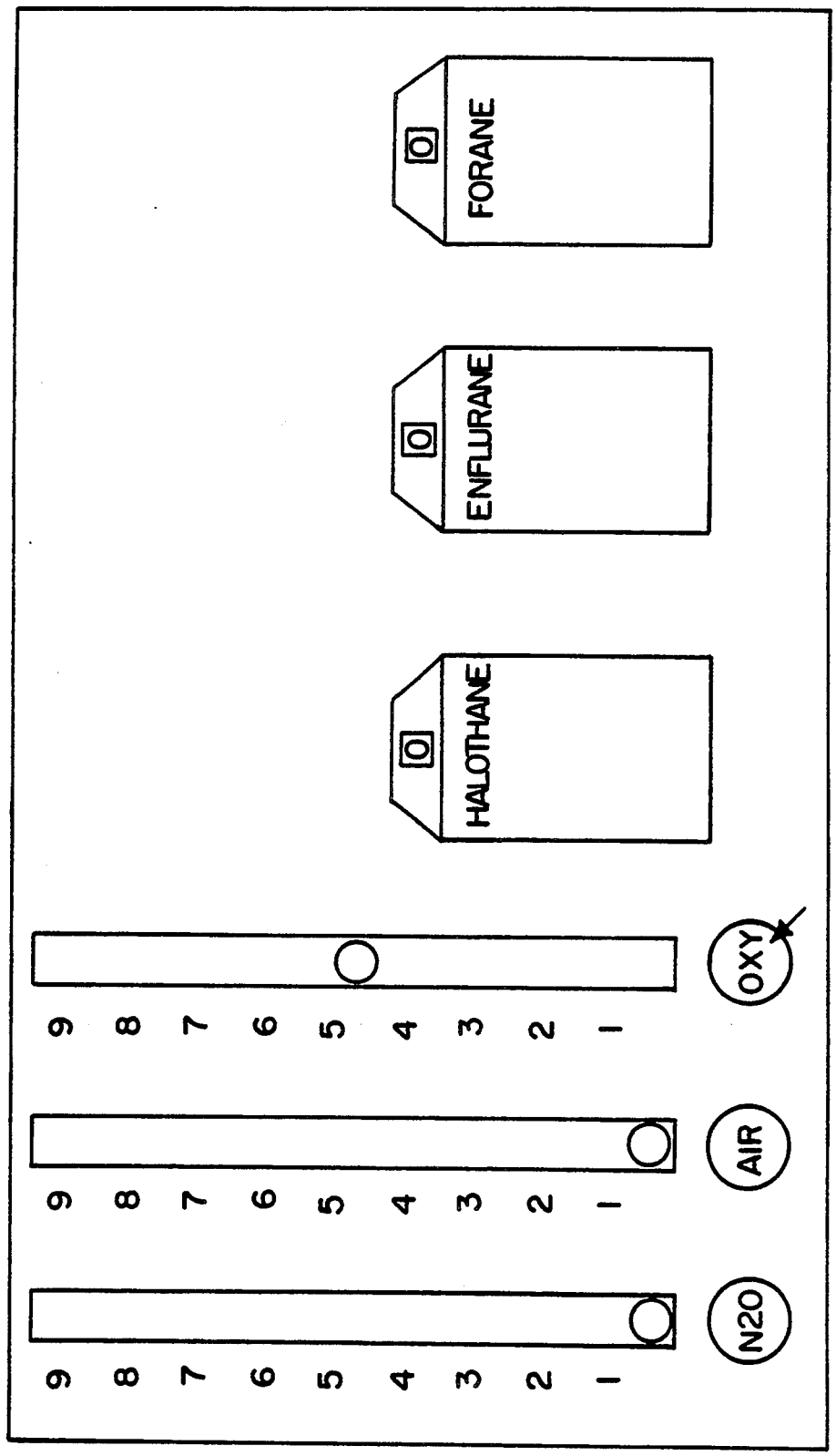
Figure 23:
Figure 24:
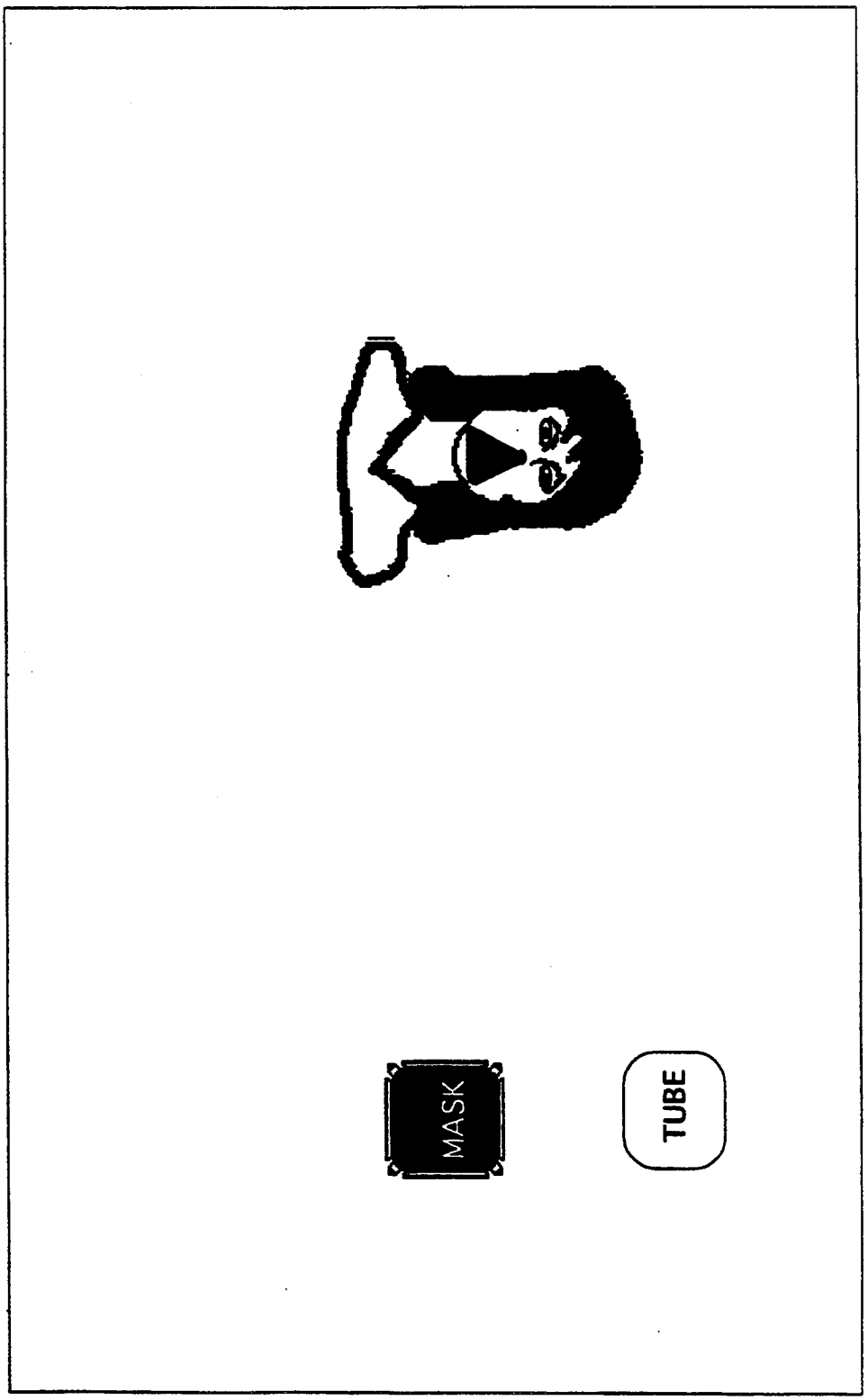
Figure 28:
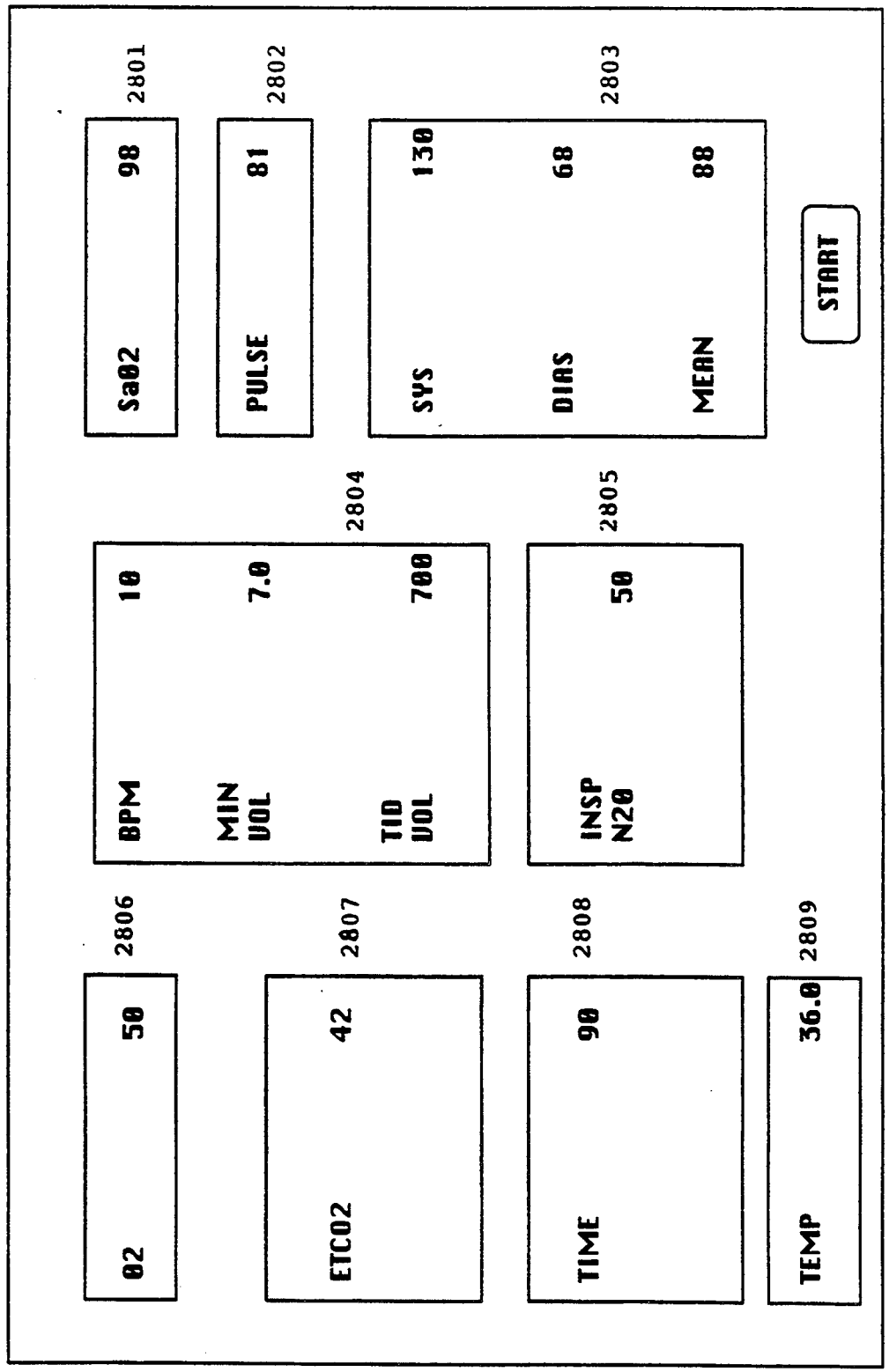
Figure 29:

FIGS. 18-32 show various screens and menus that the user may choose in a simulation. All user choices are taken from the menus shown in FIG. 18. Choices are selected by pointing and clicking a mouse. The choices include general information regarding the simulator 181, file 182, intravenous agents (IV Agents) 183, fluids 184, visuals that the anesthesiologist would see in the operating room (Look At) 185 and miscellaneous (Misc) 186. Initially, the user can choose the patient's chart from the Look At menu 185, and this screen is shown in FIG. 19 to comprise the patient's chart which includes basic patient information, the operation to be performed and the patient's initial vital signs. The user exits the screen by indicating "CLOSE" (or "DONE" in other items) with the mouse. Next, the user chooses the intravenous fluid screen as shown in FIG. 20, from the menu 184. In this example shown in FIG. 20, the user has chosen an infusion of Ringer's lactate (R1) at 300 ml per hour. The user then chooses from the Miscellaneous menu 186 of FIG. 18 the available monitors screen shown in FIG. 21. In the example, the user has chosen all six monitors, namely, EKG, blood pressure, pulse oximetry, temperature, end-tidal $CO_2$ and nerve stimulator. The user now chooses flowmeters from the Look At menu 185 and the screen of FIG. 22 will appear. In this case, the user has chosen 5 liters per minute of oxygen flow which allows pre-oxygenation of the patient. The user than chooses to induce the anesthetic by calling up the Induction screen shown in FIG. 23. In the illustrated example, the user has chosen 250 mg of sodium pentothal. When this is completed, the user chooses Patient, in which case screen FIG. 24 appears. Here the user has chosen the MASK button and the mask is applied to the patient. After an appropriate time, the screen shows that the patient's eyes are closed indicating that the patient has fallen asleep. At this point, the user chooses flowmeters from the Look At menu at FIG. 18 and the screen FIG. 23 appears again. In the illustrated example, the user chooses a 50—50 mix of nitrous oxide and oxygen shown by phantom lines and turns the vapor anesthetic Halothane to 2%. Next the operator chooses a drug to facilitate endotracheal intubation. Toward this end the screen of FIG. 25 is selected from the IV Agents menu file of FIG. 18. Here the user has chosen to administer 20 mg of Tracrium.

Next, the user chooses nerve stimulator (NerveStim) from the Look At menu 185 and the screen shown at FIG. 26 appears. The nerve stimulator monitor is now followed to determine when conditions are right for intubation of the patient. The train-of-four (TOF) is used. The panel on the left shows some fade in the third and fourth twitches. The panel on the right shows fade and twitches 1 and 2 while twitches 3 and 4 have disappeared. After all four twitches have disappeared from the train-of-four mode, the user chooses the Patient from the Look At menu and the screen in FIG. 24 appears. However, at this time, the user chooses the tube option so that a tube is shown instead of the mask.

In the example, the user next chooses Ventilator from menu 186 to call up the screen of FIG. 27. A volume of 700 cc's per breath and 10 breaths per minute are chosen. After the ventilator is set, the user selects the DataWindow from menu 185 and the screen in FIG. 28 appears. This shows all of the patient's vital signs, including oxygen saturation 2801, pulse rate 2802, blood pressure 2803, the ventilator settings 2804, the proportions of nitrous oxide 2805 and oxygen 2806, the end-tidal $CO_2$ 2807, the time 2808 and the temperature 2809. At this point, all of the patient's vital signs look good.

At some random time, which in the illustrated example, is time 128, the patient's pulse rate and end-tidal $CO_2$ begin to rise. There is also an increase in the blood pressure. As the pulse rate, end-tidal $CO_2$, and the blood pressure begin to rise, oxygen saturation begins to fall in the illustrated example to 96. These trends continue so that at time 149 the pulse rate is 118, end-tidal $CO_2$ 54, blood pressure 143/89, and oxygen saturation down to 95. Since the user has not as yet taken any action, all of the trends continue and the temperature starts to rise at time 177. All the trends are continuing and at time 205 the patient's temperature has risen to 36.6° C. All of these changes appear in the DataWindow screen of FIG. 28.

Assume that the user now correctly diagnoses the condition as malignant hyperthermia and decides to take action. Flowmeters is selected from the menu 185 and screen of FIG. 23 reappears except that OXY and $N_2O$ are both set at 2 liters/min. The user now turns off the nitrous oxide which returns to zero, the oxygen is turned up to 100% (or 9 liters/min.) and the Halothane is discontinued. Next, the user calls up the screen shown in FIG. 29 (misc . . . in the LookAt menu), and chooses to administer 300 mg of Dantrolene. The ventilator screen (FIG. 27) is called up and the setting is changed to 1000 cc's at 14 breaths per minute. These actions satisfy the evaluations of FIG. 12a.

Notwithstanding the user's intervention, the patient's condition continues to worsen and the data window is as shown in FIG. 30. Here the patient has moved to the Mh3 script. Then, the patient's condition begins to improve with the pulse rate, blood pressure, end-tidal $CO_2$ falling and the oxygen saturation rising. However, the temperature continues to rise slowly. Since the patient's vital signs are improving, the variable gBetter in each script block will be true, the temperature will drop, and eventually, the program will cycle through Mh2, Mh1 and to Paragon.

In the above example, the user made the right diagnosis and took appropriate action to return the patient to the Paragon condition. However, let us assume for the sake of illustration that the user had taken all the appropriate actions except that the Halothane vapor anesthetic which was set at 2% had not been turned off. Under that circumstance, since the MH "trigger" was not removed, the program flow would proceed from Mh2 to Mh3, and then to Critical1, cardiovascular collapse would have occurred and eventually pulse rate and blood pressure would have dropped to zero.

While the scripts for acute surgical bleeding and embolism are structured similarly to that for malignant hyperthermia, the changes in patient vital signs and the corrective action taken by the operator will of course be different. For example, in the case of acute surgical bleeding, the vital sign screen of FIG. 28 will initially show a slight decrease in blood pressure and oxygen saturation with a slight rise in pulse. As the bleeding continues, blood pressure and oxygen saturation continue to drop and the pulse continues to rise. If the program gets to the Bleed 3 script, the blood pressure is very low and the pulse is quite high. The corrective action required by the user is illustrated in FIGS. 9a and 9b. First, the user must give a bolus of the proper fluid and amount which is evaluated at 93c. Secondly, the anesthetic must be turned off and the patient given 100% oxygen as evaluated at 94b. Finally, the patient must be placed in the Trendelenberg (head down) position as evaluated at 95b. If these actions are taken within the time limits set by the program, the patient will return the to Paragon condition. Unless of course, the Variable bleedingControlled is set to False, in which case conditions will worsen despite the user's best efforts. If not, the patient's condition will descend to critical.

In the case of an embolism, the user sees a quite sudden dramatic drop in blood pressure, oxygen saturation end-tidal $CO_2$ and an increase in pulse rate. The corrective action required is illustrated in FIGS. 15a and 15b. The patient must be given 100% oxygen, the anesthetic and nitrous oxide must be discontinued, the patient must be placed in the Trendeleriberg position, and the patient must be given ephedrine. As before, these actions must be taken within time limits set by the program.

The method according to the invention provides visual patient vital sign information to an operator and randomly modifies the vital sign information in accordance with one of a plurality of scripts. The program evaluates the user responses to changes in the vital sign information to determine whether the user has made an appropriate response in a timely fashion. If these responses are appropriate and timely, the patients vital sign information improves. On the other hand, if the responses are inappropriate or untimely or both, the patient vital signs information deteriorates to a critical condition. The changes in the vital signs according to the scripts are based upon experience and mirrors those which would occur in the event of various mal-events during surgery such as embolism, malignant hyperthermia and/or acute surgical bleeding.

While the foregoing examples have been discussed with respect to either malignant hyperthermia, bleeding or embolism, the invention contemplates interactive mal-events which would be a combination of two or even three of the mal-events. Also, the invention contemplates specific changes in patient vital signs which do not signal a mal-event and do not require intervention. Moreover, if the user takes appropriate action upon the occurrence of a mal-event, such as the delivery of an appropriate drug and in an appropriate amount, the patient's condition may stabilize in one of the scripts and not return to Paragon or descend to critical.

Also, while three scripts consisting of three script blocks have been illustrated and discussed, the script matrix may be expanded to include additional scripts and the scripts expanded to include additional script blocks. Moreover, while the invention has been illustrated with respect to anesthesiology, it also has application to other medical fields, such as, but not limited to, surgery, cardiology (e.g. cardiac catherization), and the like. Realism is enhanced because the method according to the invention includes enough modifiers to enable fine tuning of all outputs.

Accordingly, while only a single embodiment of the invention has been illustrated and described, it is not intended to be limited thereby, but only by the scope of the appended claims.

I claim:

1. A method of simulating emergency conditions as might be experienced in the operating room, including the steps of displaying from a memory simulated initial patient vital sign information representing a desired patient condition, modifying the vital sign information in accordance with one of a plurality of scripts, displaying a plurality of user input options, evaluating the input options selected by the user from the plurality of options in relation to preferred option choices in the script to determine the appropriateness and timeliness of the user responses, modifying the vital sign data in accordance with said script for improvements of vita sign information displayed if the user responses are appropriate and timely for return to the desired patient condition or continuing to display worsening patient vital sign information a critical condition in accordance with the script if the responses are inappropriate or untimely, providing a plurality of script blocks in each script, said script blocks being initiated sequentially representing worsening patient conditions, and passing to a lower script block if the simulated patient's condition worsens and rising to a higher script block if the simulated patient's condition improves, assigning a numerical value to each correct user selection or selections untimely made and progressing upwardly in the script when a positive threshold number is achieved and moving downwardly in the script when a negative threshold number is achieved, providing the user with a plurality of options, timing the user response time, transitioning through the script blocks in accordance with the evaluation of the user response time and appropriateness of the user choices.

2. The method as set forth in claim 1 wherein the changes in vital signs in each script matrix is randomized.

3. The method set forth in claim 1 and including the step of assigning a numerical value to each correct user option selection within a predetermined time limit and assigning a negative value to each incorrect user selection or selections untimely made and progressing upwardly in the matrix when a positive threshold number is achieved and moving downwardly in the matrix when a negative threshold number is achieved.

4. The method set forth in claim 3 wherein said simulated patient condition is acute surgical bleeding, determining whether said user has chosen from options a proper intravenous fluid and appropriate amount, determining whether the user has increased the oxygen level to 100%, determining whether the user has selected a head down user position determining whether the user actions were taken within predetermined time limits.

5. The method set forth in claim 3 wherein said simulated patient condition is malignant hyperthermia, determining whether the user has selected from options a correct intravenous drug in a correct dose, determining from options whether the user has discontinued vapor anesthesia and determine whether the user actions were taken within predetermined time limits.

6. The method set forth in claim 3 wherein the simulated patient condition is embolism and including the step of determining whether the user has selected from options to increase oxygen level to 100%, determining whether the user has selected from options the discontinuation of the delivery of gaseous anesthetic, determining whether the user has selected the patient head down position from options, determining whether the user has selected from options the administration of a correct drug, and determining whether the user has taken these actions within predetermined time limits.

7. A method of simulating anesthesiology operating room conditions including the steps of displaying initial patient simulated vital sign information from a memory to signify an initial patient condition, displaying modified patient vital sign information in accordance with a first script of a plurality of scripts and thereby indicating a simulated deteriorating patient condition, displaying a plurality of user input options, interfacing options selected by the user with script, evaluating the timeliness and appropriateness of user choices from said options in response to the changes in patient vital sign information and displaying improved patient vital sign information or displaying deteriorating patient vital signs information in accordance with successive scripts in the plurality of scripts depending upon the inputs selected by the user from said options and timeliness of the user inputs, providing a plurality of scripts in a script matrix, said scripts being initiated sequentially representing worsening patient conditions, and passing to a lower script if the simulated patient's condition worsens and rising to a higher script if the simulated patient's condition improves, assigning numerical value to each correct user option selection within predetermined time limit and assigning a negative value to each incorrect user selection or selections untimely made and progressing upwardly in the script matrix when a positive threshold number is achieved and moving downwardly in the script matrix when a negative threshold number is achieved, providing the user with a plurality of options, timing the user response time, transitioning through the scripts in accordance with the evaluation of the user response time and appropriateness of the user choices.

8. The method set forth in claim 7 including the step of additionally modifying the displaying patient vital sign information in a manner analogous to that in which a patient's vital signs would be effected in the operating room by drugs and other external effects.

9. The method as set forth in claim 7 wherein the changes in vital signs in each script is randomized.

10. The method set forth in claim 7 wherein said simulated patient condition is acute surgical bleeding, determining whether said user has chosen from options a proper intravenous fluid and appropriate amount, determining whether the user has increased the oxygen level to 100%, determining whether the user has selected a head down user position determining whether the user actions were taken within predetermined time limits.

11. The method set forth in claim 7 wherein said simulated patient condition is malignant hyperthermia, determining whether the user has selected from options a correct intravenous drug, determining from options whether the user has discontinued vapor anesthesia and determine whether the user actions were taken within predetermined time limits.

12. The method set forth in claim 7 wherein the simulated patient condition is embolism and including the step of determining whether the user has selected from options to increase oxygen level to 100%, determining whether the user has selected from options the discontinuation of the delivery of gaseous anesthetic, determining whether the user has selected the patient head down position from options, determining whether the user has selected from options the administration of a correct drug, and determining whether the user has taken these actions within predetermined time limits.

13. A simulator for training health professionals to respond to mal-events occurring in a model patient, the combination comprising:

a display for indicating the condition of the model patient;

input means for receiving the health professional's response to the indicated model patient condition;

means for storing a plurality of scripts, each of which simulates a mal-event occurring in the model patient, and each of which is comprised of a series of script blocks that store state data which indicates on the display a corresponding series of progressively worse model patient conditions;

means for storing data associated with each script which identifies responses to the simulated mal-event which will improve model patient condition;

timer means for measuring the time interval between the indication of a model patient condition on the display and the input of the health professional's response;

evaluation means coupled to the means for storing data, the timer means and the input means, the evaluation means being operable to score the health professional's response to the indicated model patient condition and select a script block indicating an improved model patient condition if the score exceeds a preselected amount, and select a script block indicating a worse model patient condition if the score is below another preselected amount, in which evaluation means decreases the score as a function of the measured time interval.

14. The simulator as recited in claim 13 in which the evaluation means increases the score for each response from the health professional which will improve model patient condition by an amount determined by said stored data.

15. The simulator as recited in claim 13 in which the evaluation means selects a script block indicating a worse model patient condition if the measured time interval reaches a preselected amount before the health professional makes an appropriate response through the input means.

* * * * *

UNITED STATES PATENT AND TRADEMARK OFFICE
CERTIFICATE OF CORRECTION

Patent No.    : 5,385,474

Dated         : Jan. 31, 1995

Inventor(s)   : Charles Brindis

It is certified that error appears in the above-identified patent and that said Letters Patent is hereby corrected as shown below:

Title page:
Item [76], "Brindle" should be --Brindis--.

Column 2, line 29, "sponses:" should be --sponses;--.

Column 3, line 52, "screen" should be --screen 17.--.

Column 6, line 11, "threshold." should be --threshold,--.

Column 6, line 58, "true." should be --true,--.

Column 7, line 33, "non true," should be --not true,--.

Column 8, line 55-56, "Eva- lEmbol" should be --Eval-Embol--.

Column 8, line 58, "Criticall" should be --Critical1--.

Column 9, line 32, "That neutral," should be --That is, neutral,--.

Column 9, line 60, "(R1)" should be --(R1)--.

Column 11, line 22, "Criticall" should be --Critical1--.

Column 11, line 56, "Trendeleriberg" should be --Trendelenberg--.

UNITED STATES PATENT AND TRADEMARK OFFICE
CERTIFICATE OF CORRECTION

Patent No.    : 5,385,474
Dated         : Jan. 31, 1995
Inventor(s)   : Charles Brindis It is certified that error appears in the above-identified patent and that said Letters Patent is hereby corrected as shown below:

In The Claims

Claim 1, Column 12, line 48, "vita" should be --vital--.

Claim 1, Column 12, line 52, "information a" should be --information to a--.

Claim 7, Column 13, line 46, "with script" should be --with the script--.

Claim 7, Column 13, line 59, "assigning numerical" should be --assigning a numerical--.

Claim 7, Column 13, line 60, "within predeter-" should be --within a predeter---.

Signed and Sealed this

Twenty-third Day of May, 1995

Attest:

BRUCE LEHMAN

*Attesting Officer*            *Commissioner of Patents and Trademarks*